(12) United States Patent
Antonakakis et al.

(10) Patent No.: US 9,686,291 B2
(45) Date of Patent: Jun. 20, 2017

(54) METHOD AND SYSTEM FOR DETECTING MALICIOUS DOMAIN NAMES AT AN UPPER DNS HIERARCHY

(71) Applicant: DAMBALLA, INC., Atlanta, GA (US)

(72) Inventors: Manos Antonakakis, Dunwoody, GA (US); Roberto Perdisci, Smyrna, GA (US); Wenke Lee, Atlanta, GA (US); Nikolaos Vasiloglou, II, Atlanta, GA (US)

(73) Assignee: Damballa, Inc., Santa Clara, CA (US)

( * ) Notice: Subject to any disclaimer, the term of this patent is extended or adjusted under 35 U.S.C. 154(b) by 0 days.

(21) Appl. No.: 14/096,803

(22) Filed: Dec. 4, 2013

(65) Prior Publication Data
US 2014/0157414 A1    Jun. 5, 2014

Related U.S. Application Data

(63) Continuation of application No. 13/358,303, filed on Jan. 25, 2012, now Pat. No. 8,631,489.

(60) Provisional application No. 61/438,492, filed on Feb. 1, 2011.

(51) Int. Cl.
| | | |
|---|---|---|
| *G06F 11/00* | (2006.01) | |
| *H04L 29/06* | (2006.01) | |
| *H04L 29/12* | (2006.01) | |

(52) U.S. Cl.
CPC ...... *H04L 63/1408* (2013.01); *H04L 61/1511* (2013.01); *H04L 63/1425* (2013.01); *H04L 63/1483* (2013.01)

(58) Field of Classification Search
CPC ............ H04L 63/1441; H04L 61/1511; H04L 29/12066; H04L 63/1408; H04L 63/1425; H04L 63/1483

USPC ............................................ 713/23; 709/223
See application file for complete search history.

(56) References Cited

U.S. PATENT DOCUMENTS

| | | |
|---|---|---|
| 4,843,540 A | 6/1989 | Stolfo |
| 4,860,201 A | 8/1989 | Stolfo et al. |
| 5,363,473 A | 11/1994 | Stolfo et al. |
| 5,497,486 A | 3/1996 | Stolfo et al. |
| 5,563,783 A | 10/1996 | Stolfo et al. |
| 5,668,897 A | 9/1997 | Stolfo |
| 5,717,915 A | 2/1998 | Stolfo et al. |
| 5,748,780 A | 5/1998 | Stolfo |
| 5,920,848 A | 7/1999 | Schultzer et al. |

(Continued)

FOREIGN PATENT DOCUMENTS

| | | |
|---|---|---|
| WO | WO 02/37730 | 5/2002 |
| WO | WO 02/098100 | 12/2002 |
| WO | WO 2007/050244 | 5/2007 |

OTHER PUBLICATIONS

Cliff Changchun Zou et al., "Code Red Worm Propagation Modeling and Analysis", In Proceedings of 9th ACM Conference on Computer and Communications Security (CCS '02), Nov. 18, 2002.

(Continued)

*Primary Examiner* — Techane Gergiso
(74) *Attorney, Agent, or Firm* — Pepper Hamilton LLP

(57) ABSTRACT

A method and system for detecting a malicious domain name, comprising: collecting domain name statistical information from a non-recursive domain name system name server (RDNS NS); and utilizing the collected domain name statistical information to determine if a domain name is malicious or benign.

22 Claims, 5 Drawing Sheets

(56) References Cited

U.S. PATENT DOCUMENTS

| | | |
|---|---|---|
| 6,401,118 B1 | 6/2002 | Thomas |
| 6,983,320 B1 | 1/2006 | Thomas et al. |
| 7,013,323 B1 | 3/2006 | Thomas et al. |
| 7,039,721 B1 | 5/2006 | Wu et al. |
| 7,043,759 B2 | 5/2006 | Kaaschoek et al. |
| 7,069,249 B2 | 6/2006 | Stolfo et al. |
| 7,093,292 B1 | 8/2006 | Pantuso |
| 7,136,932 B1 | 11/2006 | Schneider |
| 7,152,242 B2 | 12/2006 | Douglas |
| 7,162,741 B2 | 1/2007 | Eskin et al. |
| 7,225,343 B1 | 5/2007 | Honig et al. |
| 7,277,961 B1 | 10/2007 | Smith et al. |
| 7,278,163 B2 | 10/2007 | Banzhof |
| 7,331,060 B1 | 2/2008 | Ricciulli |
| 7,372,809 B2 | 5/2008 | Chen et al. |
| 7,383,577 B2 | 6/2008 | Hrastar et al. |
| 7,424,619 B1 | 9/2008 | Fan et al. |
| 7,426,576 B1 | 9/2008 | Banga et al. |
| 7,448,084 B1 | 11/2008 | Apap et al. |
| 7,483,947 B2 | 1/2009 | Starbuck |
| 7,487,544 B2 | 2/2009 | Schultz et al. |
| 7,536,360 B2 | 5/2009 | Stolfo et al. |
| 7,549,169 B1 | 6/2009 | Sobel et al. |
| 7,634,808 B1 | 12/2009 | Szor |
| 7,639,714 B2 | 12/2009 | Stolfo et al. |
| 7,657,935 B2 | 2/2010 | Stolfo et al. |
| 7,665,131 B2 | 2/2010 | Goodman |
| 7,698,442 B1 | 4/2010 | Krishnamurthy |
| 7,712,134 B1 | 5/2010 | Nucci et al. |
| 7,752,125 B1 | 7/2010 | Kothari et al. |
| 7,752,665 B1 | 7/2010 | Robertson et al. |
| 7,779,463 B2 | 8/2010 | Stolfo et al. |
| 7,784,097 B1 | 8/2010 | Stolfo et al. |
| 7,818,797 B1 | 10/2010 | Fan et al. |
| 7,882,542 B2 | 2/2011 | Neystadt |
| 7,890,627 B1 | 2/2011 | Thomas |
| 7,913,306 B2 | 3/2011 | Apap et al. |
| 7,930,353 B2 | 4/2011 | Chickering |
| 7,962,798 B2 | 6/2011 | Locasto et al. |
| 7,979,907 B2 | 7/2011 | Schultz et al. |
| 7,996,288 B1 | 8/2011 | Stolfo |
| 8,015,414 B2 | 9/2011 | Mahone |
| 8,019,764 B1 | 9/2011 | Nucci |
| 8,074,115 B2 | 12/2011 | Stolfo et al. |
| 8,161,130 B2 | 4/2012 | Stokes |
| 8,170,966 B1 | 5/2012 | Musat et al. |
| 8,180,916 B1 | 5/2012 | Nucci et al. |
| 8,200,761 B1 | 6/2012 | Tevanian |
| 8,224,994 B1* | 7/2012 | Schneider ............ G06Q 30/02 709/217 |
| 8,260,914 B1* | 9/2012 | Ranjan ................ H04L 61/1511 709/224 |
| 8,341,745 B1* | 12/2012 | Chau et al. .................. 726/24 |
| 8,347,394 B1* | 1/2013 | Lee .................... H04L 61/1511 726/22 |
| 8,402,543 B1 | 3/2013 | Ranjan et al. |
| 8,418,249 B1 | 4/2013 | Nucci et al. |
| 8,484,377 B1 | 7/2013 | Chen et al. |
| 8,516,585 B2 | 8/2013 | Cao et al. |
| 8,527,592 B2* | 9/2013 | Gabe ................... G06Q 10/107 709/206 |
| 8,631,489 B2 | 1/2014 | Antonakakis et al. |
| 8,826,438 B2 | 9/2014 | Perdisci et al. |
| 2001/0014093 A1 | 8/2001 | Yoda et al. |
| 2001/0044785 A1 | 11/2001 | Stolfo et al. |
| 2001/0052007 A1 | 12/2001 | Shigezumi |
| 2001/0052016 A1 | 12/2001 | Skene et al. |
| 2001/0055299 A1 | 12/2001 | Kelly |
| 2002/0021703 A1 | 2/2002 | Tsuchiya et al. |
| 2002/0066034 A1 | 5/2002 | Schlossberg et al. |
| 2002/0166063 A1 | 11/2002 | Lachman et al. |
| 2002/0178238 A1* | 11/2002 | Fletcher ............ H04L 29/12009 709/220 |
| 2003/0065926 A1 | 4/2003 | Schultz et al. |
| 2003/0065943 A1 | 4/2003 | Geis et al. |
| 2003/0069992 A1 | 4/2003 | Ramig |
| 2003/0167402 A1 | 9/2003 | Stolfo et al. |
| 2003/0204621 A1 | 10/2003 | Poletto et al. |
| 2003/0236995 A1 | 12/2003 | Fretwell, Jr. |
| 2004/0002903 A1 | 1/2004 | Stolfo et al. |
| 2004/0039798 A1* | 2/2004 | Hotz ................... H04L 61/1511 709/219 |
| 2004/0044791 A1* | 3/2004 | Pouzzner ................ G06F 17/22 709/245 |
| 2004/0088348 A1 | 5/2004 | Yeager |
| 2004/0111636 A1 | 6/2004 | Baffes et al. |
| 2004/0181687 A1 | 9/2004 | Nachenberg et al. |
| 2004/0187032 A1 | 9/2004 | Gels et al. |
| 2004/0205474 A1 | 10/2004 | Eskin et al. |
| 2004/0215972 A1 | 10/2004 | Sung et al. |
| 2005/0021848 A1 | 1/2005 | Jorgenson |
| 2005/0036501 A1* | 2/2005 | Chung ..................... H04L 29/06 370/401 |
| 2005/0039019 A1 | 2/2005 | Delany |
| 2005/0086523 A1 | 4/2005 | Zimmer et al. |
| 2005/0108407 A1 | 5/2005 | Johnson et al. |
| 2005/0108415 A1 | 5/2005 | Turk et al. |
| 2005/0257264 A1 | 11/2005 | Stolfo et al. |
| 2005/0261943 A1 | 11/2005 | Quarterman et al. |
| 2005/0265331 A1 | 12/2005 | Stolfo |
| 2005/0278540 A1* | 12/2005 | Cho ........................ G06F 21/31 713/182 |
| 2005/0281291 A1 | 12/2005 | Stolfo et al. |
| 2006/0015630 A1 | 1/2006 | Stolfo et al. |
| 2006/0031483 A1* | 2/2006 | Lund ..................... G06Q 10/107 709/224 |
| 2006/0068806 A1 | 3/2006 | Nam |
| 2006/0075084 A1 | 4/2006 | Lyon |
| 2006/0143711 A1 | 6/2006 | Huang et al. |
| 2006/0146816 A1 | 7/2006 | Jain |
| 2006/0150249 A1 | 7/2006 | Gassen et al. |
| 2006/0156402 A1 | 7/2006 | Stone et al. |
| 2006/0168024 A1* | 7/2006 | Mehr ..................... H04L 12/585 709/206 |
| 2006/0176822 A1 | 8/2006 | Doyle et al. |
| 2006/0178994 A1 | 8/2006 | Stolfo et al. |
| 2006/0200539 A1* | 9/2006 | Kappler ................. G06F 9/4416 709/220 |
| 2006/0212925 A1* | 9/2006 | Shull ..................... G06F 21/55 726/1 |
| 2006/0212942 A1 | 9/2006 | Barford et al. |
| 2006/0224677 A1 | 10/2006 | Ishikawa et al. |
| 2006/0230039 A1 | 10/2006 | Shull |
| 2006/0247982 A1 | 11/2006 | Stolfo et al. |
| 2006/0253581 A1* | 11/2006 | Dixon ................ G06F 17/30861 709/225 |
| 2006/0253584 A1 | 11/2006 | Dixon |
| 2006/0259967 A1 | 11/2006 | Thomas et al. |
| 2006/0265436 A1 | 11/2006 | Edmond |
| 2007/0050708 A1 | 3/2007 | Gupta et al. |
| 2007/0056038 A1 | 3/2007 | Lok |
| 2007/0064617 A1 | 3/2007 | Reves |
| 2007/0076606 A1 | 4/2007 | Olesinski |
| 2007/0083931 A1 | 4/2007 | Spiegel |
| 2007/0118669 A1* | 5/2007 | Rand et al. ................. 709/245 |
| 2007/0136455 A1 | 6/2007 | Lee et al. |
| 2007/0162587 A1* | 7/2007 | Lund ..................... G06Q 10/107 709/223 |
| 2007/0209074 A1 | 9/2007 | Coffman |
| 2007/0239999 A1 | 10/2007 | Honig et al. |
| 2007/0253377 A1* | 11/2007 | Janneteau ......... H04L 29/12066 370/338 |
| 2007/0274312 A1 | 11/2007 | Salmela et al. |
| 2007/0294339 A1* | 12/2007 | Ala-Kleemola ....... G06Q 10/00 709/203 |
| 2007/0294419 A1 | 12/2007 | Ulevitch |
| 2008/0028073 A1* | 1/2008 | Trabe et al. ................. 709/225 |
| 2008/0028463 A1* | 1/2008 | Dagon ............. H04L 29/12066 726/22 |
| 2008/0060054 A1 | 3/2008 | Srivastava |
| 2008/0060071 A1 | 3/2008 | Hennan |
| 2008/0098476 A1 | 4/2008 | Syversen |

(56) References Cited

U.S. PATENT DOCUMENTS

| | | |
|---|---|---|
| 2008/0133300 A1 | 6/2008 | Jalinous |
| 2008/0155694 A1 | 6/2008 | Kwon et al. |
| 2008/0177736 A1 | 7/2008 | Spangler |
| 2008/0177755 A1 | 7/2008 | Stern et al. |
| 2008/0178293 A1 | 7/2008 | Keen et al. |
| 2008/0184371 A1 | 7/2008 | Moskovitch |
| 2008/0195369 A1 | 8/2008 | Duyanovich et al. |
| 2008/0222729 A1 | 9/2008 | Chen et al. |
| 2008/0229415 A1 | 9/2008 | Kapoor |
| 2008/0262985 A1 | 10/2008 | Cretu et al. |
| 2008/0263659 A1 | 10/2008 | Alme |
| 2008/0276111 A1 | 11/2008 | Jacoby et al. |
| 2009/0055929 A1 | 2/2009 | Lee et al. |
| 2009/0083855 A1 | 3/2009 | Apap et al. |
| 2009/0106304 A1 | 4/2009 | Song |
| 2009/0138590 A1 | 5/2009 | Lee et al. |
| 2009/0193293 A1 | 7/2009 | Stolfo et al. |
| 2009/0198997 A1* | 8/2009 | Yeap .................. H04L 63/0823 713/155 |
| 2009/0210417 A1 | 8/2009 | Bennett |
| 2009/0222922 A1 | 9/2009 | Sidiroglou et al. |
| 2009/0241190 A1 | 9/2009 | Todd et al. |
| 2009/0241191 A1 | 9/2009 | Keromytis et al. |
| 2009/0254658 A1 | 10/2009 | Kamikura et al. |
| 2009/0254989 A1 | 10/2009 | Achan et al. |
| 2009/0254992 A1 | 10/2009 | Schultz et al. |
| 2009/0265777 A1 | 10/2009 | Scott |
| 2009/0282479 A1 | 11/2009 | Smith et al. |
| 2009/0327487 A1 | 12/2009 | Olson et al. |
| 2010/0011243 A1 | 1/2010 | Locasto et al. |
| 2010/0011420 A1* | 1/2010 | Drako et al. ...................... 726/5 |
| 2010/0017487 A1 | 1/2010 | Patinkin |
| 2010/0023810 A1 | 1/2010 | Stolfo et al. |
| 2010/0031358 A1 | 2/2010 | Elovici et al. |
| 2010/0034109 A1 | 2/2010 | Shomura et al. |
| 2010/0037314 A1 | 2/2010 | Perdisci et al. |
| 2010/0054278 A1 | 3/2010 | Stolfo et al. |
| 2010/0064368 A1 | 3/2010 | Stolfo et al. |
| 2010/0064369 A1 | 3/2010 | Stolfo et al. |
| 2010/0071068 A1 | 3/2010 | Bauschert et al. |
| 2010/0077481 A1 | 3/2010 | Polyakov et al. |
| 2010/0077483 A1 | 3/2010 | Stolfo et al. |
| 2010/0082758 A1* | 4/2010 | Golan .................. G06Q 10/107 709/206 |
| 2010/0138919 A1 | 6/2010 | Peng |
| 2010/0146615 A1 | 6/2010 | Locasto et al. |
| 2010/0153785 A1 | 6/2010 | Keromytis et al. |
| 2010/0169970 A1 | 7/2010 | Stolfo et al. |
| 2010/0235915 A1* | 9/2010 | Memon ................. H04L 63/145 726/23 |
| 2010/0269175 A1 | 10/2010 | Stolfo et al. |
| 2010/0274970 A1 | 10/2010 | Treuhaft et al. |
| 2010/0275263 A1 | 10/2010 | Bennett et al. |
| 2010/0281539 A1 | 11/2010 | Burns et al. |
| 2010/0281541 A1 | 11/2010 | Stolfo et al. |
| 2010/0281542 A1 | 11/2010 | Stolfo et al. |
| 2010/0319069 A1* | 12/2010 | Granstedt et al. ............... 726/22 |
| 2010/0332680 A1 | 12/2010 | Anderson et al. |
| 2011/0040706 A1 | 2/2011 | Sen et al. |
| 2011/0041179 A1 | 2/2011 | Stahlberg |
| 2011/0067106 A1 | 3/2011 | Evans et al. |
| 2011/0167493 A1 | 7/2011 | Song et al. |
| 2011/0167494 A1 | 7/2011 | Bowen et al. |
| 2011/0185423 A1 | 7/2011 | Sallam |
| 2011/0185428 A1 | 7/2011 | Sallam |
| 2011/0214161 A1 | 9/2011 | Stolfo et al. |
| 2012/0079101 A1 | 3/2012 | Muppala et al. |
| 2012/0084860 A1 | 4/2012 | Cao et al. |
| 2012/0102568 A1 | 4/2012 | Tarbotton et al. |
| 2012/0117641 A1* | 5/2012 | Holloway ........... H04L 63/0281 726/12 |
| 2012/0143650 A1 | 6/2012 | Crowley et al. |
| 2012/0198549 A1 | 8/2012 | Antonakakis et al. |
| 2012/0215909 A1 | 8/2012 | Goldfarb et al. |
| 2013/0054802 A1 | 2/2013 | Donzis et al. |
| 2013/0174253 A1 | 7/2013 | Thomas et al. |
| 2013/0232574 A1 | 9/2013 | Carothers |
| 2014/0068763 A1 | 3/2014 | Ward et al. |
| 2014/0068775 A1 | 3/2014 | Ward et al. |
| 2014/0075558 A1 | 3/2014 | Ward et al. |
| 2014/0090058 A1 | 3/2014 | Ward et al. |
| 2014/0289854 A1 | 9/2014 | Mahvi |
| 2015/0026808 A1 | 1/2015 | Perdisci et al. |

OTHER PUBLICATIONS

Cliff C. Zou et al,. "Email Worm Modeling and Defense", In the 13th ACM International Confrerence on Computer Communications and Networks (CCCN '04), Oct. 27, 2004.

Cliff Changchun Zou et al., "Monitoring and Early Warning for Internet Worms", In Proceedings fo the 10th ACM Conference on Computer and Communications Security (CCS '03), Oct. 2003.

Cliff Changchun Zou et al., "On the Performance of Internet Worm Scanning Strategies", Technical Report TR-03-CSE-07, Umass ECE Dept., Nov. 2003.

Alexander Gostev, "Malware Elovution: Jan.-Mar. 2005", Viruslist.com, http://www.viruslist.com/en/analysis?pubid=162454316, (Apr. 18, 2005).

Jiang Wu et al., "An Effective Architecture and Algorithm for Detecting Worms with Various Scan Techniques", In Proceedings of the 11th Annual Network and Distributed System Security Symposium (NDSS '04), Feb. 2004.

Matthew M. Williamson et al., "Virus Throttling for Instant Messaging", Virus Bulletin Conference, Sep. 2004, Chicago, IL, USA, (Sep. 2004).

F. Weimer, "Passive DNS Replication", http://www.enyo.de/fw/software/dnslogger, 2005.

Ke Wang et al., "Anomalous Payload-Based Network Intrusion Detection", In Proceedings of the 7th International Symposium on Recent Advances in Intrusion Detection (RAID 2004), 2004.

P. Vixie et al,. "RFC 2136: Dynamic Updates in the Domain Name System (DNS Update)", http://www.faqs.org/rfcs.rfc2136.html (Apr. 1997).

Joe Stewart, "Dipnet/Oddbob Worm Analysis", SecureWorks, http://www.secureworks.com/research/threats/dipnet/ (Jan. 13, 2005).

Harold Thimbleby et al., "A Framework for Modeling Trojans and Computer Virus Infection", Computer Journal, vol. 41, No. 7, pp. 444-458 (1999).

Paul Bachner et al., "Know Your Enemy: Tracking Botnets", http://www.honeynet.org/papers/bots/, (Mar. 13, 2005).

"LockDown Security Bulletin—Sep. 23, 2001", http://lockdowncorp.com/bots/ (Sep. 23, 2001).

Colleen Shannon et al., "The Spread of the Witty Worm", http://www.caida.org/analysis/security/witty/index.xml (Mar. 19, 2004).

Moheeb Abu Rajab et al., "On the Effectiveness of Distributed Worm Monitoring", In Proceedings fo the 14th USENIX Security Symposium (2005).

Niels Provos, "CITI Technical Report 03-1: A Virtual Honeypot Framework", http://www.citi.umich.edu/techreports/reports/citi-tr-03-1.pdf (Oct. 21, 2003).

"Know your Enemy: Honeynets", http://www.honeypot.org/papers/honeynet, (May 31, 2006).

David Moore et al., "Internet Quarantine: Requirements for Containing Self-Propagating Code", In Proceedings of the IEEE INFOCOM 2003, Mar. 2003.

Joe Stewart, "I-Worm Baba Analysis", http://secureworks.com/research/threats/baba (Oct. 22, 2004).

David Moore et al., "Slammer Worm Dissection: Inside the Slammer Worm", IEEE Security & Privacy, vol. 1, No. 4 (Jul.-Aug. 2003).

David Moore et al., "Code-Red: A Case Study on the Spread and Victims of an Internet Worm", http://www.icir.org/vern/imw-2002/imw2002-papers/209.ps/gz (2002).

Joe Stewart, "Sinit P2P Trojan Analysis", http://www.secureworks.com/research/threats/sinit, (Dec. 8, 2003).

(56) References Cited

OTHER PUBLICATIONS

Martin Krzywinski, "Port Knocking—Network Authentication Across Closed Ports", Sys Admin Magazine, vol. 12, pp. 12-17 (2003).
Christopher Kruegel et al., "Anomaly Detection of Web-Based Attacks", In Proceedings of the 10th ACM Conference on Computer and Communication Security (CCS '03), Oct. 27-31, 2003, Washington, DC, USA, pp. 251-261.
"Dabber Worm Analysis", LURHQ Threat Intelligence Group, http://www.lurhq.com/dabber.html (May 13, 2004).
Abstract of Jeffrey O. Kephart et al,. "Directed-Graph Epidemiological Models of Computer Viruses", Proceedings of the 1991 IEEE Computer Society Symposium on Research in Security and Privacy; Oakland, CA, May 20-22, 1991; pp. 343-359 (May 20-22, 1991).
C. Kalt "RFC 2810—Internet Relay Chat: Architecture" http://faqs.org/rfcs/rfc2810.html (Apr. 2000).
Xuxian Jiang et al., "Cerias Tech Report 2005-24: Virtual Playgrounds for Worm Behavior Investigation", Purdue University, Feb. 2005.
Neal Hindocha et al., "Malicious Threats and Vulnerabilities in Instant Messaging", Virus Bulletin International Conference, Sep. 2003.
Thomer M. Gil, "NSTX (IP-over-DNS) HowTo", http://thomer.com/howtos/nstx.html, Nov. 4, 2005 (5 pages).
V. Fuller et al., "RFC 1519—Classless Inter-Domain Routing (CIDR): An Address Assignment and Aggregation Strategy", http://www.faqs.org/rfcs/rfc1519.html (Sep. 1993).
David E. Smith "Dynamic DNS", http://www.technopagan.org/dynamic (Aug. 7, 2006).
Dave Dittrich, "Active Response Continuum Research Project", http://staff.washington.edu/dittrich/arc/ (Nov. 14, 2005).
Joe Stewart, "Akak Trojan Analysis", http://www.secureworks.com/research/threats/akak/ (Aug. 31, 2004).
Monirul I. Sharif, "Mechanisms of Dynamic Analysis and DSTRACE".
Kapil Kumar Singh, "IRC Reconnaissance (IRCRecon) Public IRC Heuristics (BotSniffer)" (Jul. 24, 2006).
http://www.trendmicro.com/en/home/us/home.htm.
"2006 Press Releases: Trend Micro Takes Unprecedented Approach to Eliminating Botnet Threats with the Unveiling of InterCloud Security Service", http://www.trendmicro.com/en/about/news/pr/archive/2006/pr092506.htm, (Sep. 25, 2006).
Paul F. Roberts, "Trend Micro Launches Anti-Botnet Service", InfoWorld, http://www.infoworld.com/article/06/09/25/HNtrendintercloud_1.html (Sep. 25, 2006).
CNN Technology News—Expert: Botnets No. 1 Emerging Internet Threat, CNN.com, http://www.cnn.com/2006/TECH/internet/01/31/furst.index.html (Jan. 31, 2006).
Evan Cooke et al., "The Zombie Roundup: Understanding, Detecting, and Disrupting Botnets", In USENIX Workshop on Steps to Reducing Unwanted Traffic on the Internet (SRUTI), Jun. 2005.
Sven Dietrich et al., "Analyzing Distributed Denial of Service Tools: The Shaft Case", Proceedings of the 14th Systems Administration Conference (LISA 2000), New Orleans, Louisiana, USA, Dec. 3-8, 2000.
Felix C. Freiling et al,. "Botnet Tracking: Exploring a Root-Cause Methodology to Prevent Distributed Denial-of-Service Attacks", ESORICS 2005, LNCS 3679, pp. 319-335 (2005).
Luiz Henrique Gomes et al,. "Characterizing a Spam Traffic", In Proc. ACM SIGCOMM Internet Measurement Conference (IMC '04), Oct. 25-27, 2004 Taormina, Sicily, Italy, pp. 356-369.
Christopher W. Hanna, "Using Snort to Detect Rogue IRC Bot Programs", Technical Report, SANS Institute 2004 (Oct. 8, 2004).
Jaeyeon Jung et al., "An Empirical Study of Spam Traffic and the Use of DNS Black Lists", In Proc. ACM SIGCOMM Internet Measurement Conference (IMC '04), Oct. 25-27, 2004, Taormina, Sicily, Italy, pp. 370-375.

Srikanth Kandula et al., "Botz-4-Sale: Surviving Organized DDoS Attacks That Mimic Flash Crowds", Technical Report LCS TR-969, Laboratory for Computer Science, MIT, 2004.
Sven Krasser et al., "Real-Time and Forensic Network Data Analysis Using Animated and Coordinated Visualization", Proceedings of the 6th IEEE Information Assurance Workshop (Jun. 2005).
David Moore et al., "Inferring Internet Denial-of-Service Activity", In Proceedings of the 2001 USENIX Security Symposium, 2001.
Stephane Racine, "Master's Thesis: Analysis for Internet Relay Chat Usage by DDoS Zombies", ftp://www.tik.ee.ethz.ch/pub/students/2003-2004-Wi/MA-2004-01.pdf (Nov. 3, 2003).
Anirudh Ramachandran et al., "Understanding the Network-Level Behavior of Spammers", SIGCOMM '06, Sep. 11-15, 2006, Pisa, Italy, pp. 291-302.
Ramneek Puri, "Bots & Botnet: An Overview", SANS Institute 2003, http://www.giac.com/practical/GSEC/Ramneek_Puri_GSEC.pdf (Aug. 8, 2003).
Stuart E. Schechter et al., "Access for Sale: A New Class of Worm", In 2003 ACM Workshop on Rapid Malcode (WORM '03), ACM SIGSAC, Oct. 27, 2003, Washington, DC, USA.
Stuart Staniford, "How to Own the Internet in Your Spare Time", In Proc. 11th USENIX Security Symposium, San Francisco, CA, Aug. 2002.
Martin Overton, "Bots and Botnets: Risks, Issues and Prevention", 2005 Virus Bulletin Conference at the Burlington, Dublin, Ireland, Oct. 5-7, 2005, http://arachnid.homeip.net/papers/VB2005-Bots_and_Botnets-1.0.2.pdf.
Yin Zhang et al., "Detecting Stepping Stones", Proceedings of the 9th USENIX Security Symposium, Denver, Colorado, USA, Aug. 14-17, 2000.
Joe Stewart, "Bobax Trojan Analysis", http://www.lurhq.com/bobax.html, May 17, 2004.
David Brumley et al., "Tracking Hackers on IRC", http://www.doomded.com/texts/ircmirc/TrackingHackersonIRC.htm, Dec. 8, 1999.
Brian Krebs, "Bringing Botnets Out of the Shadows", Washingtonpost.com, http://www.washingtonpost.com/wp-dyn/content/artcile/2006/03/21/AR2006032100279_pf.html, Mar. 21, 2006.
"SwatIT: Bots, Drones, Zombies, Worms and Other Things That Go Bump in the Night", http://swatit.org/bots, 2004.
Christian Kreibich, "Honeycomb: Automated NIDS Signature Creation Using Honeypots", 2003, http://www.cl.cam.ac.uk/research/srg/netos/papers/2003-honeycomb-sigcomm-poster.pdf.
David Moore, "Network Telescopes: Observing Small or Distant Security Events", http://www.caida.org/publications/presentations/2002/usenix_sec/usenix_sec_2002_files/frame.htm; Aug. 8, 2002.
Vincent H. Berk et al., "Using Sensor Networks and Data Fusion for Early Detection of Active Worms", Sensors, and Command, Control, Communications, and Intelligence (C3iI) Technologies for Homeland Defense and Law Enforcement II, Proceedings of SPIE, vol. 5071, pp. 92-104 (2003).
David Dagon et al., "Worm Population Control Through Periodic Response", Technical Report, Georgia Institute for Technology, Jun. 2004.
Scott Jones et al., "The IPM Model of Computer Virus Management", Computers & Security, vol. 9, pp. 411-418 (1990).
Jeffrey O. Kephart et al., "Directed-Graph Epidemiological Models of Computer Viruses", In Proceedings of IEEE Symposium on Security and Privacy, pp. 343-359 (1991).
Darrell M. Kienzle et al., "Recent Worms: A Survey and Trends", In WORM '03, Proceedings of the 2003 ACM Workshop on Rapid Malcode, Washington, DC, USA, pp. 1-10, Oct. 27, 2003.
Bill McCarty, "Botnets: Big and Bigger", IEEE Security and Privacy Magazine, vol. 1, pp. 87-89 (2003).
Xinzhou Qin et al., "Worm Detection Using Local Networks", Technical Report GIT-CC-04-04, College of Computing, Georgia Institute of Technology, Feb. 2004.
Yang Wang et al., "Modeling the Effects of Timing Parameters on Virus Propagation", In Proceedings of ACM CCS Workshop on Rapid Malcode (WORM '03), Washington, DC, pp. 61-66, Oct. 27, 2003.

(56) References Cited

OTHER PUBLICATIONS

Donald J. Welch et al., "Strike Back: Offensive Actions in Information Warfare", in AMC New Security Paradigm Workshop, pp. 47-52 (1999).
Liston, "Welcome to my Tarpit: The Tactical and Stragetic Use of LaBrea", http://www.hackbusters.net/LaBrea/LaBrea.txt, Oct. 24, 2001.
Pointer, "Eggdrop Development", http://www.eggheads.org, Oct. 1, 2005.
S. Staniford, "Code Red Analysis Pages: July Infestation Analysis", http://silicondefense.org/cr/july.html, Nov. 18, 2001.
Alex MA, "NetGeo—The Internet Geographic Database", http://www.caida.org/tools/utilities/netgeo/index.xml, Sep. 6, 2006.
MathWorks Inc. Simulink, http://www.mathworks.com/products/simulink, Dec. 31, 2005.
David Dagon et al., "Modeling Botnet Propagation Using Time Zones", In Proceedings of the 13th Annual Network and Distributed Systems Security Symposium (NDSS '06), Feb. 2006.
John Canavan, "Symantec Security Response: W32.Bobax.D", http://www.sarc.com/avcent/venc/data/w32.bobax.d.html, May 26, 2004.
"Whois Privacy", www.gnso.icann.org/issues/whois-privacy/index/shtml, Jun. 3, 2005.
John D. Hardin, "The Scanner Tarpit HowTo", http://www.impsec.org/linus/security/scanner-tarpit.html, Jul. 20, 2002.
Charles J. Krebs, "Ecological Methodology", Harper & Row, Publishers, New York, pp. v-x, 15-37, 155-166, and 190-194 (1989).
D.J. Daley et al., "Epidemic Modeling: An Introduction", Cambridge University Press, pp. vii-ix, 7-15, and 27-38 (1999).
Lance Spitzner, "Honeypots: Tracking Hackers", Addison-Wesley, pp. vii-xiv, 73-139, 141-166, and 229-276 (2003).
International Search Report issued in Application No. PCT/US06/038611 mailed Jul. 8, 2008.
Written Opinion issued in Application No. PCT/US06/038611 mailed Jul. 8, 2008.
International Preliminary Report on Patentability issued in Application No. PCT/US06/038611 mailed Mar. 26, 2009.
O. Diekmann et al,. "Mathematical Epidemiology of Infectious Diseases: Model Building, Analysis and Interpretation", John Wiley & Son, Ltd., 2000, pp. v-xv and 1-303.
Jelena Mirkovic et al,. "Internet Denial of Service: Attack and Defense Mechanisms", Prentice Hall Professional Technical Reference, 2004, pp. v-xxii and 1-372.
"Symantec Internet Security Threat Report: Trends for Jan. 1, 2004-Jun. 30, 2004" Symantec, Sep. 2004, pp. 1-54.
David Dagon et al., "HoneyStat: Local Worm Detection Using Honeypots", RAID 2004, LNCS 3224, pp. 39-58 (2004).
Jonghyun Kim et al., "Measurement and Analysis of Worm Propagation on Internet Network Topology", IEEE, pp. 495-500 (2004).
Andreas Marx, "Outbreak Response Times: Putting AV to the Test", www.virusbtn.com, Feb. 2004, pp. 4-6.
Vinod Yegneswaran et al., "Global Intrusion Detection in the DOMINO Overlay System", Proceedings of Network and Distributed Security Symposium (NDSS), 17 pages Feb. 2004.
Vinod Yegneswaran et al., "On the Design and Use of Internet Sinks for Network Abuse Monitoring", RAID 2004, LNCS 3224, pp. 146-165 (2004).
Cliff Changchun Zou et al., "Worm Propagation Modeling and Analysis Under Dynamic Quarantine Defense", WORM'03, Oct. 27, 2003, Washington, DC USA, 10 pages.
Cliff C. Zou et al., "Routing Worm: A Fast, Selective Attack Worm Based on IP Address Information", Technical Report: TR-03-CSE-06, Principles of Advanced and Distributed Simulation (PADS) 2005, pp. 199-206, Jun. 1-3, 2005.
Thorsten Holz, "Anti-Honeypot Technology", 21st Chaos Communication Congress, slides 1-57, Dec. 2004.
"CipherTrust's Zombie Stats", http://www.ciphertrust.com/resources/statistics/zombie.php 3 pages, printed Mar. 25, 2009.
Joe Stewart, "Phatbot Trojan Analysis", http://www.secureworks.com/research/threats/phatbot, Mar. 15, 2004, 3 pages.

Thorsten Holz et al., "A Short Visit to the Bot Zoo", IEEE Security & Privacy, pp. 7679 (2005).
Michael Glenn, "A Summary of DoS/DDoS Prevention, Monitoring and Mitigation Techniques in a Service Provider Environment", SANS Institute 2003, Aug. 21, 2003, pp. ii-iv, and 1-30.
Dennis Fisher, "Thwarting the Zombies", Mar. 31, 2003, 2 pages.
Dongeun Kim et al., "Request Rate Adaptive Dispatching Architecture for Scalable Internet Server", Proceedings of the IEEE International Conference on Cluster Computing (CLUSTER'00); pp. 289-296 (2000).
Keisuke Ishibashi et al., "Detecting Mass-Mailing Worm Infected Hosts by Mining DNS Traffic Data", SIGCOMM'05 Workshops, pp. 159-164 (Aug. 22-26, 2005).
Nicholas Weaver et al., "A Taxonomy of Computer Worms", WORM'03, pp. 11-18 (Oct. 27, 2003).
Stephan Axelsson, "The Base-Rate Fallacy and the Difficulty of Intrusion Detection", ACM Transactions on Information and System Security, vol. 3, No. 3, pp. 186-205 (Aug. 2000).
Niel Landwehr et al., "Logistic Model Trees", Machine Learning, vol. 59, pp. 161-205 (2005).
Richard O. Duda et al., "Pattern Classification, Second Edition", John Wiley & Sons, Inc., pp. vii-xx, and 1-654, Copyright 2001.
Guofei Gu et al. "BotMiner: Clustering Analysis of Network Traffic Protocol- and Structure-Independent Botnet Detection", 2008, USENIX Security Symposium, pp. 139-154.
Zhu et al., "Using Failure Information Analysis to Detect Enterprise Zombies," Lecture note of the Institute for Computer Science, Social-Informatics and Telecommunications Engineering, vol. 19, part 4, pp. 185-206, 2009.
Manos Antonakakis et al., "Building a Dynamic Reputation System for DNS", 19th USENIX Security Symposium, Aug. 11-13, 2010 (17 pages).
Manos Antonakakis et al., "Detecting Malware Domains at the Upper DNS Hierarchy", In Proceeding of the 20th USENIX Security Symposium, Aug. 8-12, 2011 (16 pages).
Leyla Bilge et al., "EXPOSURE: Finding Malicious Domains Using Passive DNS Analysis", 18th Annual Network and Distributed System Security Symposium, Feb. 6-9, 2011 (17 pages).
"Virus:Win32/Expiro.Z". http://www.microsoft.com/security/portal/Threat/Encyclopedia/Entry.aspx, Jun. 9, 2011 (5pages).
Mike Geide, "Another Trojan Bamital Pattern", http://research.zscaler.com/2011/05/another-trojan-bamital-pattern.html, May 6, 2011 (5 pages).
Sergey Golovanov et al., "TDL4—Top Bot", http://www.secuirlist.com/en/analysis/204792180/TDL4_Top_Bot, Jun. 27, 2011 (15 pages).
P. Mockapetris, "Domain Names—Concepts and Facilities", Network Working Group, http://www.ietf.org/rfc/rfc1034.txt, Nov. 1987 (52 pages).
P. Mockapetris, "Domain Names—Implementation and Specification", Network Working Group, http://www.ietf.org/rfc/rfc1035.txt, Nov. 1987 (52 pages).
Phillip Porras et al. "SRI International Technical Report: An Analysis of Conficker's Logic and Rendezvous Points", http://mtc.sri.com/Conficker/, Mar. 19, 2009, (31 pages).
Phillip Porras et al. "SRI International Technical Report: Conficker C Analysis", http://mtc.sri.com/Conficker/addendumC, Apr. 4, 2009, (24 pages).
Paul Royal, Damballa, "Analysis of the Kracken Botnet", Apr. 9, 2008 (13 pages).
Sergei Shevchenko, "Srizbi's Domain Calculator", http://blog.threatexpert.com/2008/11/srizbix-domain-calculator.html, Nov. 28, 2008 (3 pages).
Sergei Shevchenko, "Domain Name Generator for Murofet", http://blog.threatexpert.com/2010/10/domain-name-generator-for-murofet.html, Oct. 14, 2010 (4 pages).
P Akritidis et al., "Efficient Content-Based Detection of Zero-Day Worms", 2005 IEEE International Conference in communications, vol. 2, pp. 837-843, May 2005.
M. Patrick Collins et al., "Hit-List Worm Detection and Bot Identification in Large Networks Using Protocol Graphs", RAID 2007, LNCS 4637, pp. 276-295 (2007).

(56) References Cited

OTHER PUBLICATIONS

Nicholas Weaver et al., "Very Fast Containment of Scanning Worms", In proceedings of the 13th USENIX Security Symposium, pp. 29-44, Aug. 9-13, 2004.
David Whyte et al., "DNS-Based Detection of Scanning Worms in an Enterprise Network", In Proc. of the 12th Annual Network and Distributed System Security Symposium, pp. 181-195, Feb. 3-4, 2005.
Cristian Abad et al., "Log Correlation for Intrusion Detection: A Proof of Concept", In Proceedings of The 19th Annual Computer Security Application Conference (ACSAC'03), (11 pages) (2003).
Lala A. Adamic et al., "Zipf's Law and the Internet", Glottometrics, vol. 3, pp. 143-150 (2002).
K.G. Anagnostakis et al., "Detecting Targeted Attacks Using Shadow Honeypots", In Proceedings of the 14th USENX Secuirty Symposium, pp. 129-144 (2005).
Paul Baecher et al., "The Nepenthes Platform: An Efficient Approach to Collect Malware", In Proceedings of Recent Advances in Intrusion Detection (RAID 2006), LNCS 4219, pp. 165-184, Sep. 2006.
Paul Barford et al., "An Inside Look at Botnets", Special Workshop on Malware Detection, Advances in Information Security, Spring Verlag, pp. 171-192 (2006).
James R. Binkley et al., "An Algorithm for Anomaly-Based Botnet Detection", 2nd Workshop on Steps to Reducing Unwanted Traffic on the Internet (SRUTI '06), pp. 43-48, Jul. 7, 2006.
Steven Cheung et al., "Modeling Multistep Cyber Attacks for Scenario Recognition", In Proceedings of the Third DARPA Information Survivability Conference and Exposition (DISCEX III), vol. 1, pp. 284-292, Apr. 22-24, 2003.
Evan Cooke et al., "The Zombie Roundup: Understanding, Detecting, and Disrupting Botnets", Steps to Reducing Unwanted Traffic on the Internet Workshop (SRUTI '05), pp. 39-44, Jul. 7, 2005.
Frederic Cuppens et al., "Alert Correlation in a Cooperative Intrusion Detection Framework", In Proceedings of IEEE Symposium on Security and Privacy 2002, pp. 202-215 (2002).
David Dagon et al., "Modeling Botnet Propagation using Time Zones", The 13th Annual Network and Distributed System Security Symposium 2006, Feb. 2-3, 2006 (18 pages).
Roger Dingledine et al., "Tor: The Second-Generation Onion Router", In Proceedings of the 13th Usenix Security Symposium, pp. 303-320 Aug. 9-13, 2004.
Steven T. Eckman et al., "STATL: An Attack Language for State-Based Intrusion Detection", Journal of Computer Security, vol. 10, pp. 71-103 (2002).
Daniel R. Ellis, et al., "A Behavioral Approach to Worm Detection", WORM'04, Oct. 29, 2004 (11 pages).
Prahlad Fogla et al., "Polymorphic Blending Attacks", In Proceedings of 15th Usenix Security Symposium, pp. 241-256, (2006).
Jan Goebel, "Rishi: Identify Bot Contaminated Hosts by IRC Nickname Evaluation", Hot Bots'07, Apr. 10, 2007 (14 pages).
Koral Ilgun et al., "State transition Analysis: A Rule-Based Intrusion Detection Approach", IEEE Transactions on Software Engineering, vol. 21, No. 3, pp. 181-199, Mar. 1995.
Xuxian Jiang et al., "Profiling Self-Propagating Worms Via Behavioral Footprinting", WORM'06, Nov. 3, 2006 (7 pages).
Giovanni Vigna et al., "NetSTAT: A Network-based Intrusion Detection Approach", In Proceedings of the 14th Annual Computer Security Applications Conference (ACSAC '98), pp. 25-34, Dec. 7-11, 1998.
Kelly Jackson Higgins, "Shadowserver to Build 'Sinkhole' Server to Find Errant Bots: new Initiative Will Emulate IRC, HTTP Botnet Traffic", http://darkreading.com/taxonomy/index/printarticle/id/211201241. Sep. 24, 2008 (2 pages).
Kelly Jackson Higgins, "Hacking a New DNS Attack: DNS Expert Disputes Georgia Tach and Google Research That Points to Malicious Deployment of Certain Types of DNS Servers", http://darkreading.com/taxonomy/index/printarticle/id/208803784. Dec. 18, 2007 (2 pages).

Christian Kreibich, "Honeycomb: Automated Signature Creation Using Honeypots", http://www.icir.org/christain/honeycomb/index.html, Mar. 26, 2007, (3 pages).
Artem Dinaburg et al., "Ether: Malware Analysis Via Hardware Virtualization Extensions", CCS'08, Oct. 27-31, 2008 (12 pages).
Paul Royal, "Alternative Medicine: The Malware Analyst's Blue Pill", Black Hat USA 2008, Aug. 6, 2008 (33 pages).
Paul Royal, "Alternative Medicine: The Malware Analyst's Blue Pill", vvww.damballa.com/downloads/r_pubs/KrakenWhitepaper.pdf (2008) (3pages).
Robert Perdisci et al., "Behavioral Clustering of HTTP-Based Malware and Signature Generation Using Malicious Network Traces", Usenix Symposium on Networked Systems Design and Implementation (NSDI 2010), (2010) (16 Pages).
Christopher Kruegel et al., "Polymorphic Worm Detection using Structural Information of Executables", RAID 2005, pp. 207-226 (2005).
Paul Vixie, "DNS Complexity", ACM Queue, pp. 24-29, Apr. 2007.
Ke Wang et al., "Anagram: A Content Anomaly Detector Resistant to Mimicry Attack", In Proceedings of the International Symposium on Recent Advances in Intrusion Detection (RAID) (2006) (20 pages).
Ke Wang et al., "Anomalous Payload-Based Worm Detection and Signature Generation", In Proceedings of the International Symposium on Recent Advances in Intrusion Detection (RAID) (2005) (20 pages).
David Whyte, "Exposure Maps: Removing Reliance on Attribution During Scan Detection", 1st Usenix Workshop on Hot Topics in Security, pp. 51-55 (2006).
Jiahai Yang et al., "CARDS: A Distributed System for Detecting Coordinated Attacks", In Sec (2000) (10 pages).
Vinod Yegneswaran et al., "Using Honeynets for Internet Situational Awareness", In proceedings of the Fourth Workshop on Hot Topics in Networks (HotNets IV), Nov. 2005 (6 pages).
David Dagon et al., "Corrupted DNS Resolution Paths: The Rise of a Malicious Resolution Authority", In Proceedings of Network and Distributed Security Symposium (NDSS '08) (2008) (15 pages).
Dihe's IP-Index Browser, http://ipindex.homelinux.net/index.php, updated Oct. 13, 2012 (1 page).
Shuang Hao et al., "An Internet-Wide View into DNS Lookup Patterns", http://labs.verisign.com/projects/malicious-domain-names/white-paper/dns-imc2010.pdf (2010) (6 pages).
Thorsten Holz et al., "Measuring and Detecting Fast-Flux Service Networks", In Proceedings of NDSS (2008) (12 pages).
Jaeyeon Jung et al., "DNS Performance and the Effectiveness of Caching", IEEE/ACM Transactions on Networking, vol. 10, No. 5, pp. 589-603, Oct. 2002.
The Honeynet Project & Research Alliance, "Know Your Enemy: Fast-Flux Service Networks: An Ever Changing Enemy", http://old.honeynet.org/papers/ff/fast-flux.html, Jul. 13, 2007 (10 pages).
Duane Wessels et al., "Measurements and Laboratory Simulations of the Upper DNS Hierarchy", In PAM (2005) (10 pages).
Joe Stewart, "Top Spam Botnets Exposed", http://www.secureworks.com/cyber-threat-intelligence/threats/topbotnets/, Apr. 8, 2008 (11 pages).
Brett Stone-Gross et al., "Your Botnet is My Botnet: Analysis of a Botnet Takeover", CCS'09, Nov. 9-13, 2009 (13 pages).
Sam Stover et al., "Analysis of the Storm and Nugache Trojans: P2P is here", Login, vol. 32, No. 6, pp. 18-27, Dec. 2007.
"Storm Botnet", http://en.wikipedia.org/wiki/Storm_botnet, Printed Jan. 29, 2013 (7 pages).
Jeff Williams, "What We Know (and Learn) for the Waledac Takedown", http://blogs.technet.com/b/mmpc/archive/2010/03/15/what-we-know-and-learned-from-the-waledac-takedown.aspx, Mar. 15, 2010 (2 pages).
"Trojan:Java/Boonan", http://microsoft.com/security/portal/threat/encyclopedia/entry.aspx?Name=Trojan%3AJava%2FBoonan, Apr. 17, 2011 (5 pages).
Julia Wolf, "Technical Details of Srizbi's Domain Generation Algorithm", http://blog.fireeye.com/research/2008/11/technical-details-of-srizbis-domain-generation-algorithm.html, Nov. 25, 2008 (4 pages).

(56) References Cited

OTHER PUBLICATIONS

Sandeep Yadav et al., "Detecting Algorithmically Generated Malicious Domain Names", In Proceedings of the 10th Annual Conference on Internet Measurement (IMC'10), pp. 48-61, Nov. 1-3, 2010.
"TEMU: The BitBlaze Dynamic Analysis Component", http://bitblaze.cs.berkeley.edu/temu.html, printed Jan. 29, 2013 (1 page).
Paul Bacher et al., "Know Your Enemy: Tracking Botnets: Using Honeynets to Learn More About Bots", http://www.honeynet.org/papers/bots, Aug. 10, 2008 (1 page).
Michael Bailey et al., "Automated Classification and Analysis of Internet Malware", RAID 2007, LNCS 4637, pp. 178-197 (2007).
Paul Barham et al., "Xen and the Art of Virtualization", SOSP'03, Oct. 19-22, 2003 (14 pages).
Ulrich Bayer et al., "TTAnalyze: A Tool for Analyzing Malware", In Proceedings of the 15th Annual Conference European Institute for Computer Antivirus Research (EICAR), pp. 180-192 (2006).
Fabrice Bellard, "QEMU, A Fast and Portable Dynamic Translator", In Proceedings of the Annual Confernce on Usenix Annual Technical Conference, pp. 41-46 (2005).
Kevin Borders et al., "Siren: Catching Evasive Malware (Short Paper)", IEEE Symposium on Security and Privacy, pp. 78-85, May 21-24, 2006.
Christopher M. Bishop, Pattern Recognition and Machine Learning (Information Science and Statistics), Springer-Verlag New York, Inc., Secauscus, NJ, USA, 2006.
Ronen Feldman et al., "The Text Mining Handbook: Advance Approaches in Analyzing Unstructured Data", Cambridge Univ. Pr., 2007.
Michael Hale Ligh et al., "Malware Analyst's Cookbook and DVD", Wiley, 2010.
M. Newman, "Networks: An Introduction", Oxford University Press, 2010.
Matt Bishop, "Computer Security: Art and Science", Addison-Wesley Professional, 2003.
Neils Provos et al., "Virtual Honeypots: Form Botnet Tracking to Intrusion Detection", Addison-Wesley Professional, Reading, 2007.
Michael Sipser, "Introduction to the Theory of Computation", International Thomson Publishing, 1996.
Peter Szor, "The Art of Computer Virus Research and Defense", Addison-Wesley Professional, 2005.
Anil K. Jain et al., "Algorithms for Clustering Data", Prentice-Hall, Inc., 1988.
V. Laurikari, "TRE", 2006 (5 pages).
P. Porras, "Inside Risks: Reflections on Conficker", Communications of the ACM, vol. 52, No. 10, pp. 23-24, Oct. 2009.
Changda Wang et al., "The Dilemma of Covert Channels Searching", ICISC 2005, LNCS 3935, pp. 169-174, 2006.
C. Willems et al., "Toward Automated Dynamic Malware Analysis Using CWSandbox", IEEE Security and Privacy, vol. 5, No. 2, pp. 32-39, 2007.
R Developmental Core Team, "R: A Language and Environment for statistical Computing", R. Foundation for Statistical Computing, Vienna Austria, 2008.
Simon Urbanek, "rJava: Low-Level-R to Java Interface", printed May 6, 2013 (5 pages).
Juan Caballero et al., "Polyglot: Automatic Extraction of Protocol Message Format Using Dynamic Binary Analysis", In Proceedings of ACM Conference on Computer and Communication Security, Oct. 2007 (15 pages).
Mihai Christodorescu et al., "Semantics-Aware Malware Detection", In Proceeding of the 2005 IEEE Symposium on Security and Privacy, pp. 32-46 (2005).
Mihai Christodorescu et al,. "Mining Specifications on Malicious Behavior", ESEC/FSE'07, Sep. 3-7, 2007 (10 pages).
Peter Ferrie, "Attacks on Virtual Machine Emulators", Symantec Advance Threat Research, 2006 (13 pages).
Peter Ferrie, "Attacks on More Virtual Machine Emulators", Symantec Advance Threat Research, http://pferrie.tripod.com/papers/attacks2.pdf, 2007 (17 pages).
Tal Garfinkel et al., "A Virtual Machine Introspection Based Architecture for Intrusion Detection", In Proceedings of Network and Distributed Systems Security Symposium, Feb. 2003 (16 pages).
G. Hunt et al., "Detours: Binary Interception of WIN32 Functions", Proceedings of the 3rd Usenix Windows NT Symposium, Jul. 12-13, 1999 (9 pages).
Xuxian Jiang et al., "Stealthy Malware Detection Through VMM-Based "Out-of-the-Box" Semantic View Reconstruction", CCS'07, Oct. 29-Nov. 2, 2007 (11 pages).
Xuxian Jiang et al., "Virtual Playgrounds for Worm Behavior Investigation", RAID 2005, LNCS 3858, pp. 1-21 (2006).
Min Gyung Kang et al., "Renovo: A Hidden Code Extract for Packed Executables", WORM'07, Nov. 2, 2007 (8 pages).
Christopher Kruegel et al., "Detecting Kernel-Level Rootkits Through Binary Analysis", In Proceedings of the Annual Computer Security Applications Conference (ACSAC), pp. 91-100, Dec. 2004.
Lorenzo Martignoni et al., "OmniUnpack: Fast, Generic, and Safe Unpacking of Malware", In Proceedings of the Annual Computer Security Applications Conference (ACSAC), pp. 431-441 (2007).
Thomas Raffetseder et al., "Detecting System Emulators", In ISC, pp. 1-18 (2007).
Paul Royal et al., "PolyUnpack: Automating the Hidden-Code Extraction of Unpack-Executing Malware", In Proceedings of the Annual Computer Security Applications Conference (ACSAC), pp. 289-300 (2006).
Rich Uhlig et al., "Intel Virualization Technology", Computer, vol. 38, No. 5, pp. 48-56, May 2005.
Amit Vasudevan et al., "Stealth Breakpoints", In Proceedings of the 21st Annual Computer Security Applications Conference (ACSAC), pp. 381-392, (2005).
Amit Vasudevan et al., "Cobra: Fine-Grained Malware Analysis Using Stealth Localized-Executions", In Proceedings of the 2006 IEEE Symposium on Security and Privacy (S&P'06), pp. 264-279 (2006).
Yi-Min Wang et al., "Automated Web Patrol with Strider HoneyMonkeys: Finding Web Sites That Exploit Browser Vulnerabilities", In NDSS'06 (2006) (15 pages).
Heng Yin et al., "Panorama: Capturing System-Wide Information Flow for Malware Detection and Analysis", In Proceedings of ACM Conference on Computer and Communication Security, Oct. 29-Nov. 2, 2007 (13 pages).
Joanna Rutkowska, "Introducing Blue Pill", http://theinvisbilethings.blogspot.com/2006/06/introducing-blue-pill.html, Jun. 22, 2006 (26 pages).
Peter Ferrie, "Anti-Unpacker Tricks", In Proceedings of the 2nd International CARO Workshop (2008) (25 pages).
Danny Quist, "Covert Debugging Circumventing Software Armoring Techniques"; In Proceedings of Black Hat USA 2007 (2007) (5 pages).
Ulrich Bayer et al., "Scalable, Behavior-Based malware Clustering", In Network and Distributed System Security Symposium (2009) (18 pages).
David Brumley et al., "Automatically Identifying Trigger-Based Behavior in Malware", Botnet Detection, pp. 1-24 (2008).
Dancho Danchev, "Web Based Botnet Command and Control Kit 2.0", http://ddanchev.blogspot.com/2008/08/web-based-botnet-command-and-control.html, Aug. 22, 2008 (5 pages).
Ozgun Erdogan et al., "Hash-AV: Fast Virus Signature matching by Cache-Resident Filters", Int. J. Secur. Netw., vol. 2, pp. 50-59 (2007).
Fanglu Guo et al., "A Study of the Packer Problem and Its Solutions", In Recent Advances in Intrusion Detection (RAID 2008), LNCS 5230, pp. 95-115 (2008).
Maria Halkidi et al., "On Clustering Validation Techniques", Journal of Intelligent Information Systems, vol. 17, pp. 107-145 (2001).
A.K. Jain et al., "Data Clustering: A Review", ACM Computing Surveys, vol. 31, No. 3, pp. 264-323, Sep. 1999.
John P. John et al., "Studying Spamming Botnets using Botlab", In Usenix Symposium on Networked Systems Design and Implementation (NDSI), (2009) (16 pages).

(56) References Cited

OTHER PUBLICATIONS

Hyang-Ah Kim et al., "Autograph: Toward Automated, distributed Worm Signature Detection", In Usenix Security Symposium (2004) (16 pages).
Clemens Kolbitsch et al., "Effective and Efficient Malware Detection at the End Host", In 18th Usenix Security Symposium, pp. 351-366 (2009).
Kevin Borders et al., "Protecting Confidential Data on Personal Computers with Storage Capsules", In 18th Usenix Security Symposium, pp. 367-382 (2009).
Ralf Hund et al., "Return-Oriented Rootkits: Bypassing Kernel Code Integrity Protection Mechanisms", In 18th Usenix Security Symposium, pp. 383-398 (2009).
Christian Kreibich et al., "Honeycomb—Creating Intrusion Detection Signatures Using Honeypots", In ACM Workshop on Hot Topics in Networks (2003) (6 pages).
Zhichun Li et al., "Hamsa: Fast Signature Generational for Zero-Day Polymorphic Worms with Provable Attack Resilience", In IEEE Symposium on Security and Privacy (2006) (15 pages).
James Newsome et al., "Polygraph: Automatically Generating Signatures for Polymorphic Worms", In IEEE Symposium on Security and Privacy (2005) (16 pages).
Sun Wu et al., "AGREP—A Fast Approximate Pattern-Matching Tool", In Usenix Technical Conference (1992) (10 pages).
Vinod Yegneswaren et al.,, "An Architecture for Generating Semantics-Aware Signatures", In Usenix Security Symposium (2005) (16 pages).
Jaeyeon Jung, "Fast Portscan Detection Using Sequential Hypothesis Testing", In Proceedings of IEEE Symposium on Security Privacy, pp. 211-225 (2004).
Anestis Karasaridis et al., "Wide-Scale Botnet Detection and Characterization", In Usenix Workshop on Hot Topics in Understanding Botnets (HotBots'07), Apr. 11-13, 2007 (9 pages).
Carl Livades et al., "Using Machine Learning Techniques to Identify Botnet Traffic", In 2nd IEEE LCN Workshop on Network Security (WoNS'2006), pp. 967-974 (2006).
"CVE-2006-3439", http://cve.mitre.org/cgi-bin/cvename.cgi?name=CVE-2006-3439, printed Jun. 27, 2012 (2 pages).
David Moore, "Inferring Internet Denial-of-Service Activity", In Proceedings of the 10th Usenix Security Symposium, Aug. 13-17, 2001 (15 pages).
Peng Ning et al., "Constructing Attack Scenarios Through Correlation of Intrusion Alerts", In Proceedings of Computer and Communications Security (CCS'02), Nov. 18-22, 2002 (10 pages).
Vern Paxson, "Bro: A System for Detecting Network Intruders in Real-Time", In Proceedings of the 7th Usenix Security Symposium, Jan. 26-29, 1998 (22 pages).
Roberto Perdisci et al., "Using an Ensemble of One-Class SVM Classifiers to Harden Payload-Based Anomaly Detection Systems", In Proceedings of the 6th International Conference on Data Mining (ICDM'06), pp. 488-498, Dec. 2006.
Phillip A. Porras, "Privacy-Enabled Global Threat Monitoring", IEEE Security & Privacy, pp. 60-63 (2006).
Moheeb Abu Rajab et al., "A Multifaceted Approach to Understanding the Botnet Phenomenon", In Proceedings of the ACM SIGCOMM/Usenix Internet Measurement Conference (ICM'06), Oct. 25-27, 2006 (12 pages).
Anirudh Ramachandran et al., "Understanding the Network-Level Behavior of Spammers", In Proceedings of the 2006 Conference on Applications, Technologies, Architectures, and Protocols for Computer Communications (SIGCOMM'06), Sep. 11-16, 2006 (13 pages).
Martin Roesch, "SNORT—Lightweight Intrusion Detection for Networks", In Proceedings of 13th System Administration Conference (LISA'99), pp. 229-238, Nov. 7-12, 1999.
Robin Sommer et al., "Enhancing Byte-Level Network Intrusion Detection Signatures with Context", In Proceedings of the 10th ACM Conference on Computer and Communications Security (CCS'03), pp. 262-271, Oct. 27-30, 2003.

"W32/IRCBot-TO", http://www.sophos.com/virusinfo/analyses.w32ircbotto.html, Jan. 19, 2007 (1 page).
Stuart Staniford et al., "Practical Automated Detection of Stealthy Portscans", Journal of Computer Security, vol. 10, pp. 105-136 (2002).
S. Staniford-Chen et al., "GrIDs—A Graph Based Intrusion Detection System for Large Networks", In Proceedings of the 19th National Information Systems Security Conference, pp. 361-370 (1996).
Steven J. Templeton et al., "A Requires/Provides Model for Computer Attacks", In Proceedings of the 2000 Workshop on New Security Paradigms (NSPW'00), pp. 31-38 (2000).
Alfonso Valdes et al., "Probabilistic Alert Correlation", In Proceedings of the Recent Attack in Intrusion Detection (RAID 2001), LNCS 2212, pp. 54-68 (2001).
Fredrik Valeur et al., "A Comprehensive Approach to Intrusion Detection Alert Correlation", IEEE Transactions on Dependable and Secure Computing, vol. 1, No. 3, pp. 146-169, Jul. 2004.
Kjersti Aas et al., "Text Categorisation: A Survey", Norwegian Computing Center, Jun. 1999 (38 pages).
M. Andrews, "Negative Caching of DNS Queries (DNS NCACHE)", http://tools.ietf.org/html/rfc2308, Mar. 1998 (20 pages).
Simon Biles, "Detecting the Unknown with Snort and Statistical Packet Anomaly Detecting Engine", www.cs.luc.edu/~pld/courses/447/sum08/class6/biles.spade.pdf (2003) (9 pages).
James Newsome et al., "Paragraph: Thwarting Signature Learning by Training Maliciously", In Recent Advance in Intrusion Detection (RAID), 2005 (21 pages).
Jon Oberheide et al., "CloudAV: N-Version Antivirus in the Network Cloud", In Proceedings of the 17th Usenix Security Symposium, pp. 91-106 (2008).
Dan Pelleg et al., "X-Means: Extending K-Means with Efficient Estimation of the Number of Clusters", In International Conference on Machine Learning (2000) (8 pages).
Roberto Perdisci et al., "Misleading Worm Signature Generators Using Deliberate Noise Injection", In IEEE Symposium on Security and Privacy (2006) (15 pages).
Mark Felegyhazi et al., "On the Potential of Proactive Domain Blacklisting", In the Third Usenix LEET Workshop (2010) (8 pages).
Konrad Rieck et al., "Learning and Classification of Malware Behavior", DIMVA 2008, LNCS 5137, pp. 108-125 (2008).
Sumeet Singh et al., "Automated Worm Fingerprinting", In ACM/USENIX Symposium on Operating System Design and Implementation, Dec. 2004 (16 pages).
"EFnet Chat Network", http://www.efnet.org, dated Jun. 18, 2007 (3 pages).
Guofei Gu et al. "Bothunter: Detecting Malware Infection Through IDS-Driven Dialog Correlation", Proceedings of 16th USENIX Security Symposium, pp. 167-182 (2007).
The Conficker Working Group,"Conficker Working Group: Lessons Learned", Conficker_Working_Group_Lessons_Learned_17_June_2010_final.pdf, published Jan. 2011 (59 pages).
Manos Antonakakis et al., "The Command Structure of the Aurora Bonet", http://www.damballa.com/downloads/r_pubs/Aurora_Botnet_Command_Structure.pdf, 2010 (31 pages).
R. Arends et al. , "Protocol Modifications for the DNS Security Extensions", http://www.ietf.org/rfc/rfc4035.txt, Mar. 2005 (50 pages).
R. Arends et al. , "DNS Security Introduction and Requirements", htp://www.ietf.org/rfc/rfc4033.txt, Mar. 2005 (20 pages).
R. Arends et al. , "Resource Records for the DNS Security Extensions", htp://www.ietf.org/rfc/rfc4034.txt, Mar. 2005 (28 pages).
Andreas Berger et al., "Assessing the Real-World Dynamics of DNS", Lecture Notes in Computer Science, vol. 7189, pp. 1-14 (2012).
Global Research & Analysis Team (GReAT), "Full Analysis of Flame's Command & Control Servers", http://www.securelist.com/en/blog/750/Full_Analysis_of_Flames_Command_Control_Servers, Sep. 17, 2012 (10 pages).

(56) References Cited

OTHER PUBLICATIONS

Nicolas Falliere et al., "W32.Stuxnet Dossier", http://www.symantec.com/content/en/us/enterprise/media/security_response/whitepapers/w32_stuxnet_dossier.pdf, Feb. 2011 (69 pages).

Steinar H. Gunderson, "Global IPv6 Statistics: Measuring the Current State of IPv6 for Ordinary Users", http://meetings.ripe.net/ripe-57/presentations/Colitti-Global_IPv6_statistics_-_Measuring_the_current_state_of_IPv6_for_ordinary_users_.7gzD.pdf, Oct. 24-30, 2008 (20 pages).

Jaeyeon Jung et al., "Modeling TTL-Based Internet Caches", IEEE INFOCOM 2003, pp. 417-426, Mar. 2003.

Srinivas Krishnan et al., "DNS Prefetching and Its Privacy Implications: When Good Things Go Bad", In Proceeding of the 3rd USENIX Conference on Large-Scale Exploits and Emergent Threats: Botnets, Spyware, Worms, and More (LEET'10), (2010) (9 pages).

Zhuoqing Morley Mao et al., "A Precise and Efficient Evaluation of the Proximity Between Web Clients and Their Local DNS Servers", In Proceedings of USENIX Annual Technical Conference (2002) (14 pages).

Mozilla Foundation, "Public Suffix List", http://publicsuffix.org/, printed May 23, 2013 (8 pages).

David Plonka et al., "Context-Aware Clustering of DNS Query Traffic", In Proceedings of the 8th IMC (2008) (13 pages).

RSA FraudAction Research Labs, "Anatomy of an Attack", http://blogs.rsa.com/rivner/anatomy-of-an-attack/, Apr. 1, 2011 (17 pages).

Steve Souders, "Sharing Dominant Domains", http://www.stevesouders.com/blog/2009/05/12/sharding-dominant-domains, May 12, 2009 (3 pages).

Paul Vixie, "What DNS Is Not", Communications of the ACM, vol. 52, No. 12, pp. 43-47, Dec. 2009.

N. Weaver et al., "Redirecting DNS for ADS and Profit", In USENIX Workshop on Free and Open communications on the Internet (FOCI), Aug. 2011 (6 pages).

Florian Weimer, "Passive DNS Replication", In Proceedings of the 17th Annual FIRST Conference on Computer Security Incident, Apr. 2005 (13 pages).

Manos Antonakakis et al., "From Throw-Away Traffic to Bots: Detecting the Rise of DGA-Based Malware", In Proceedings of the 21st USENIX Conference on Security Symposium (Security'12), (2012) (16 pages).

T. Berners-Lee et al., "RFC3986—Uniform Resource Identifier (URI): Generic Syntax", http://www.hjp.at/doc/rfc/rfc3986.html, Jan. 2005 (62 pages).

Juan Caballero et al., "Measuring Pay-Per-Install: The Commoditization of malware Distribution", In Proceedings of the 20th USENIX Conference on Security (SEC'11), (2011) (16 pages).

Chih-Chung Chang et al., "LIBSVM: A Library for Support Vector Machines" ACM Transactions on Intelligent Systems and Technology 2011, Last Updated Jun. 14, 2007 (26 pages).

Dancho Danchev, "Leaked DIY Malware Generating Tool Spotted in the Wild", http://blog.webroot.com/2013/01/18/leaked-diy-malware-generating-tool-spotted-in-the-wild/, Jan. 18, 2013 (6 pages).

D. De La Higuera et al., "Topology of Strings: Median String is NP-Complete", Theoretical Computer Science, vol. 230, pp. 39-48 (2000).

Robert Edmonds, "ISC Passive DNS Architecture", http://kb.isc.org/getAttach/30/AA-00654/passive-dns-architecture.pdf, Mar. 2012 (18 pages).

Manuel Egele et al., "A Survey on Automated Dynamic Malware-Analysis Techniques and Tools", ACM Computing Surveys, vol. 44, No. 2, Article 6, pp. 6:1-6:42, Feb. 2012.

Dennis Fisher, "Zeus Source Code Leaked", http://threatpost.com/en_us/blogs/zeus-source-code-leaked-051011, May 10, 2011 (6 pages).

Guofei Gu et al., "BotSniffer: Detecting Botnet Command and Control Channels in Network Traffic", In Proceedings of the 15th Annual Network and Distributed System Security Symposium (NDSS'08), Feb. 2008 (18 pages).

Grefoire Jacob, "Jackstraws: Picking Command and Control Connections from Bot Traffic", In Proceedings of the 20th USENIX Conference on Security (SEC'11) (2011) (16 pages).

Jiyong Jang et al., "Bitshred: Feature Hashing Malware for Scalable Triage and Semantic Analysis", In Proceedings of the 18th ACM Conference on Computer and Communications Security (CCS'11), pp. 309-320, Oct. 17-21, 2011.

J. Zico Kolter et al., "Learning to Detect and Classify Malicious Executables in the Wild", Journal of Machine Learning Research, vol. 7, pp. 2721-2744, Dec. 2006.

John C. Platt, "Probablistic Outputs for Support Vector Machines and Comparisons to Regularized Likelihood Methods", Advances in Large margin Classifiers, vol. 10, No. 3, pp. 61-74, Mar. 26, 1999.

Team Cymru, "Developing Botnets", http://www.team-cymru.com/ReadingRoom/Whitepapers/2010/developing-botnets.pdf (2010) (3 pages).

Brett Stone-Gross et al., "Pushdo Downloader Variant Generating Fake HTTP Requests", http://www.secureworks.com/cyber-threat-intelligence/threats/Pushdo_Downloader_Variant_Generating_Fake_HTTP_Requests/, Aug. 31, 2012 (4 pages).

Peter Wurzinger et al., "Automatically Generating Models for Botnet Detection", In Proceedings of the 14th European Conference on Research in Computer Security (ESORICS'09), pp. 232-249 (2009).

Yinglian Xie et al., "Spamming Botnet: Signatures and Characteristics", In Proceeding of the ACM SIGCOMM 2008 Conference on Data Communications (SIGCOMM'08), pp. 171-182, Aug. 17-22, 2008.

Yajin Zhou et al., "Dissecting Android Malware: Characterization and Evolution", 2012 IEEE Symposium on Security and Privacy, pp. 95-109 (2012).

Nello Cristianini et al., "An Introduction to Support Vector Machines: and other Kernal-Based Learning Methods", Cambridge University Press, New York, NY, USA (2000).

Timo Sirainen, "IRSSI", http://en.wikipedia.org/wiki/Irssi, updated May 8, 2013 (3 pages).

Team Cymru, "IP to ASN Mapping", http://www.team-cymru.org/Services/ip-to-asn.html, printed Mar. 23, 2013 (6 pages).

http://www.bleedingsnort.com, retrieved from Internet Archive on May 23, 2013, Archived Sep. 26, 2006 (3 pages).

http://www.dshield.org, retrieved from Internet Archive on May 23, 2013, Archived Sep. 29, 2006 (2 pages).

http://www.alexa.com, retrieved from Internet Archive on May 23, 2013, Archived Sep. 25, 2006 (3 pages).

https://sie.isc.org/, retrieved from Internet Archive on May 23, 2013, Archived Dec. 29, 2008 (2 pages).

http://damballa.com, retrieved from Internet Archive on May 23, 2013, Archived Jan. 28, 2007 (10 pages).

http://www.dnswl.org, retrieved from Internet Archive on May 23, 2013, Archived Jul. 15, 2006 (4 pages).

http://www.spamhaus.org/sbl/, retrieved from Internet Archive on May 23, 2013, Archived Sep. 24, 2006 (24 pages).

http://malwaredomains.com, retrieved from Internet Archive on May 23, 2013, Archived Dec. 28, 2007 (12 pages).

http://www.opendns.com, retrieved from Internet Archive on May 23, 2013, Archived Sep. 9, 2006 (25 pages).

https://zeustracker.abuse.ch, retrieved from Internet Archive on May 23, 2013, Archived Oct. 26, 2010 (37 pages).

http://www.threatfire.com, retrieved from Internet Archive on May 23, 2013, Archived Aug. 22, 2007 (18 pages).

http://www.avira.com, retrieved from Internet Archive on May 23, 2013, Archived Sep. 29, 2006 (13 pages).

https://alliance.mwcollect.org, retrieved from Internet Archive on May 23, 2013, Archived Jan. 7, 2007 (2 pages).

http://malfease.oarci.net, retrieved from Internet Archive on Apr. 11, 2014, Archived Apr. 12, 2008 (2 pages).

http://www.oreans.com/themida.php, retrieved from Internet Archive on May 23, 2013, Archived Aug. 23, 2006 (12 pages).

http://www.vmware.com, retrieved from Internet Archive on May 23, 2013, Archived Sep. 26, 2006 (32 pages).

Thomas Ptacek, "Side-Channel Detection Attacks Against Unauthorized Hypervisors", http://www.matasano.com/log/930/side-channel-detection-attacks-against-unauthorized-hypervisors/, Aug.

(56) References Cited

OTHER PUBLICATIONS 20, 2007, retrieved from Internet Archive on May 23, 2013, Archived Aug. 27, 2007 (12 pages).
http://cyber-ta.org/releases/botHunter/index.html, retrieved from Internet Archive on May 23, 2013, Archived Aug. 30, 2007 (6 pages).
http://anubis.seclab.tuwien.ac.at, retrieved from Internet Archive on May 23, 2013, Archived Apr. 9, 2008 (2 pages).
http://www.siliconrealms.com, retrieved from Internet Archive on May 23, 2013, Archived Sep. 4, 2006 (12 pages).
http://bitblaze.cs.berkeley.edu, retrieved from Internet Archive on May 23, 2013, Archived Jan. 28, 2008 (4 pages).
http://www.dyninst.org, retrieved from Internet Archive on May 23, 2013, Archived Aug. 20, 2006 ( pages).
http://www.peid.info, retrieved from Internet Archive on May 23, 2013, Archived Dec. 4, 2007 (2 pages).
Mark Russinovich et al., "RegMon for Windows V7.04", http://technet.microsoft.com/en-us/sysinternals/bb896652.aspx, Published Nov. 1, 2006 (4 pages).
"Troj/Agobot-IB", http://www.sophos.com/virusinfo/analyses/trojagobotib.html, printed Jun. 27, 2012 (1 page).
Mark Russinovich et al., "FileMon for Windows V7.04", http://technet.microsoft.com/en-us/sysinternals/bb896642.aspx, Nov. 1, 2006 (6 pages).
"Norman Sandbox Whitepaper", Copyright Norman 2003 (19 pages).
Tanveer Alam et al., "Webinar: Intel Virtualization Technology of Embedded Applications", Intel, Copyright 2010 (34 pages).
F. Heinz et al., "IP Tunneling Through Nameserver", http://slashdot.org/story/00/09/10/2230242/ip-tunneling-through-nameservers, Sep. 10, 2000 (23 Pages).
http://www.mcafee.com/us/, printed May 23, 2013 (23 pages).
"Windows Virtual PC", http://en.wikipedia.org/wiki/Windows_Virtual_PC, Last Modified May 5, 2013, Printed May 23, 2013 (21 pages).
Par Fabien Perigaud, "New Pill?", http://cert.lexsi.com/weblog/index.php/2008/03/21/223-new-pill, Mar. 21, 2008 (3 pages).
http://handlers.sans.org/jclausing/userdb.txt, printed May 24, 2013 (149 pages).
Avi Kivity et al., "KVM: The Linux Virtual Machine Monitor", Proceedings of the Linux Symposium, pp. 225-230, Jun. 27-30, 2007.
Symantec, "Symantec Global Internet Security Threat Report: Trends for 2008", vol. XIV, Apr. 2009 (110 pages).
File History of U.S. Appl. No. 11/538,212.
File History of U.S. Appl. No. 12/985,140.
File History of U.S. Appl. No. 13/008,257.
File History of U.S. Appl. No. 13/358,303.
File History of U.S. Appl. No. 14/304,015.
"InterCloud Security Service", http://www.trendmicro.com/en/products/nss/icss/evaluate/overview.html (2006) (2 pages).
DMOZ Open Directory Project, Dynamic DNS Providers List, http://dmoz.org/Computers/Software/Internet/Servers/Address_Management/Dynamic_DNS_Services/, Mar. 19, 2007 (3 pages).
File History of U.S. Appl. No. 14/015,621.
File History of U.S. Appl. No. 13/205,928.
File History of U.S. Appl. No. 13/309,202.
File History of U.S. Appl. No. 14/015,582.
File History of U.S. Appl. No. 14/015,704.
File History of U.S. Appl. No. 14/015,661.
File History of U.S. Appl. No. 14/041,796.
File History of U.S. Appl. No. 14/194,076.
Leo Breiman, "Bagging Predictors", Machine Learning, vol. 24, pp. 123-140 (1996).
David S. Anderson et al., "Spamscatter: Characterizing Internet Scam Hosting Infrastructure", Proceedings of the USENIX Security Symposium (2007) (14 pages).
Sujata Garera et al., "A Framework for Detection and Measurement of Phishing Attacks", WORM'07, pp. 1-8, Nov. 2, 2007.
Torsten Horthorn et al., "Double-Bagging: Combining Classifiers by Bootstrap Aggregation", Pattern Recognition, vol. 36, pp. 1303-1309 (2003).
Roberto Perdisci et al., "Detecting Malicious Flux Service Networks Through Passive Analysis of Recursive DNS Traces", Proceedings of ACSAC, Honolulu, Hawaii, USA (2009) (10 pages).
Shuang Hao et al., "Detecting Spammers with SNARE: Spatiotemporal Network-Level Automatic Reputation Engine", 18th USENIX Security Symposium, pp. 101-117 (2009).
Kazumichi Sato et al., "Extending Black Domain Name List by Using Co-Occurrence Relation Between DNS Queries", Presentation in the Third USENIX LEET Workshop (2010) (22 pages).
Sushant Sinha et al., "Shades of Grey: On the Effectiveness of Reputation-Based Blacklists", In 3rd International Conference on MALWARE (2008) (8 pages).
Zhiyun Qian et al., "On Network-Level Clusters for Spam Detection", In Proceedings of the USENIX NDSS Symposium (2010) (17 pages).
Bojan Zdrnja et al., "Passive Monitoring of DNS Anomalies", In Proceedings of DIMVA Conference (2007) (11 pages).
Jian Zhang et al., "Highly Predictive Blacklisting", In Proceedings of the USENIX Security Symposium (2008) (16 pages).
http://www.uribl.com/about.shtml, retrieved from Internet Archive on Mar. 16, 2016, Archived Jul. 22, 2010 (4 pages).
http://www.spamhaus.org/zen/, retrieved from Internet Archive on Mar. 16, 2016, Archived Jul. 6, 2010 (3 pages).
Mathew Sullivan, "Fighting Spam by Finding and Listing Exploitable Servers", Apricot 2006 (26 pages).
Mekky et al. (Detecting Malicious HTTP Redirections Using Trees of User Browser Activity, IEEE INFOCOM 2014, pp. 1159-1167).
File History of U.S. Appl. No. 12/538,612.
File History of U.S. Appl. No. 13/749,205.
File History of U.S. Appl. No. 14/010,016.
File History of U.S. Appl. No. 14/015,663.
File History of U.S. Appl. No. 14/305,998.
File History of U.S. Appl. No. 14/317,785.
File History of U.S. Appl. No. 14/616,387.
File History of U.S. Appl. No. 14/668,329.
File History of U.S. Appl. No. 15/019,272.
Nan Jiang et al., "Identifying Suspicious Activities Through DNS Failure Graph Analysis", In proceedings of the 18th IEEE International Conference on Network Protocols (ICNP'10) IEEE Computer Society, Washington, DC, USA, 144-153 (2010).

* cited by examiner

US 9,686,291 B2
METHOD AND SYSTEM FOR DETECTING MALICIOUS DOMAIN NAMES AT AN UPPER DNS HIERARCHY

CROSS-REFERENCE TO RELATED APPLICATIONS

This application is a continuation of U.S. patent application Ser. No. 13/358,303, filed Jan. 25, 2012 which claims the benefit of U.S. Provisional Patent Application No. 61/438,492, filed Feb. 1, 2011. All of the foregoing are incorporated by reference in their entireties.

BRIEF DESCRIPTION OF EMBODIMENTS OF THE INVENTION

Figure 1:
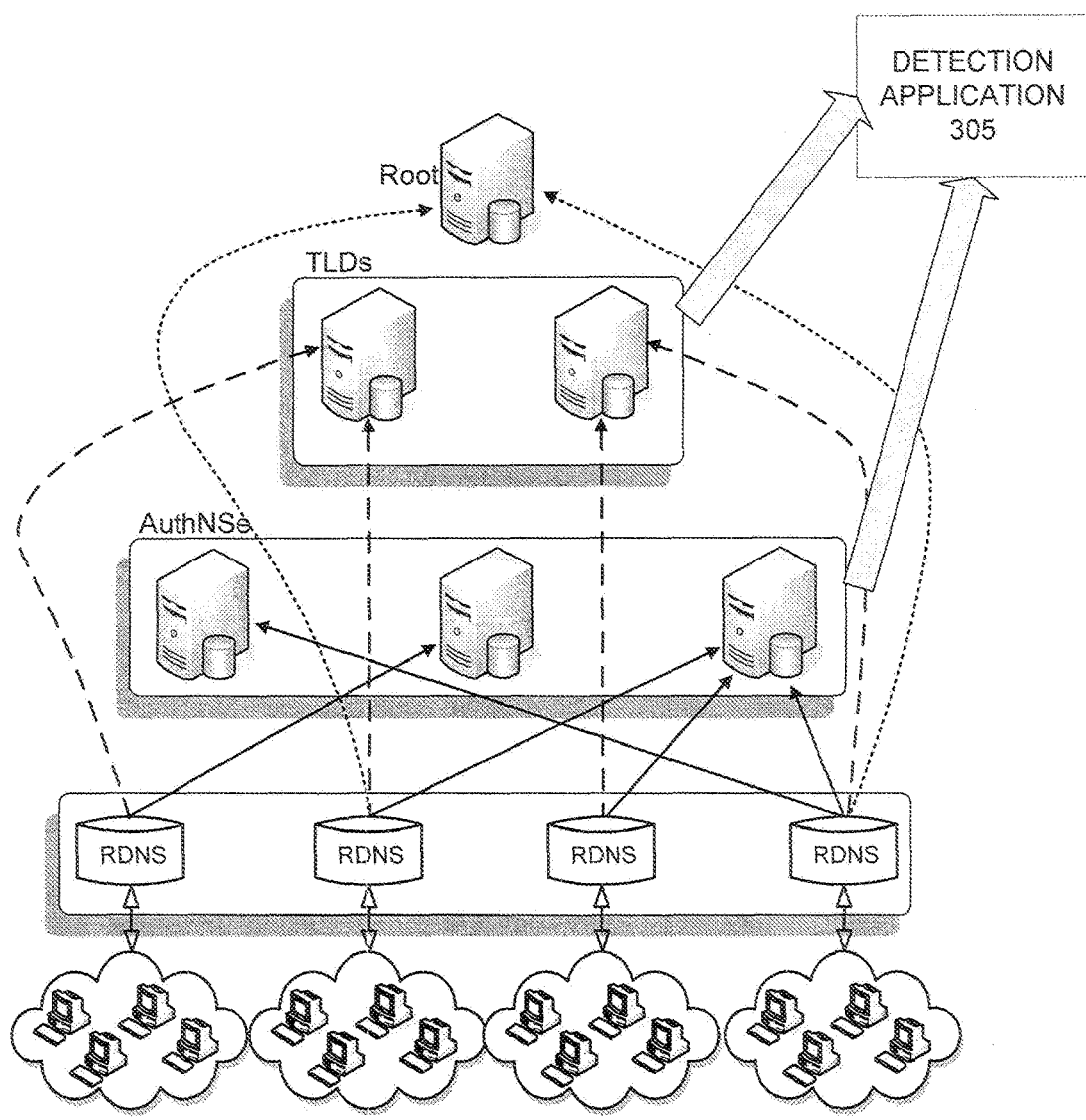
FIGS. 1-3 illustrate details related to a system for detecting a malicious domain name, according to one embodiment.
Figure 2:
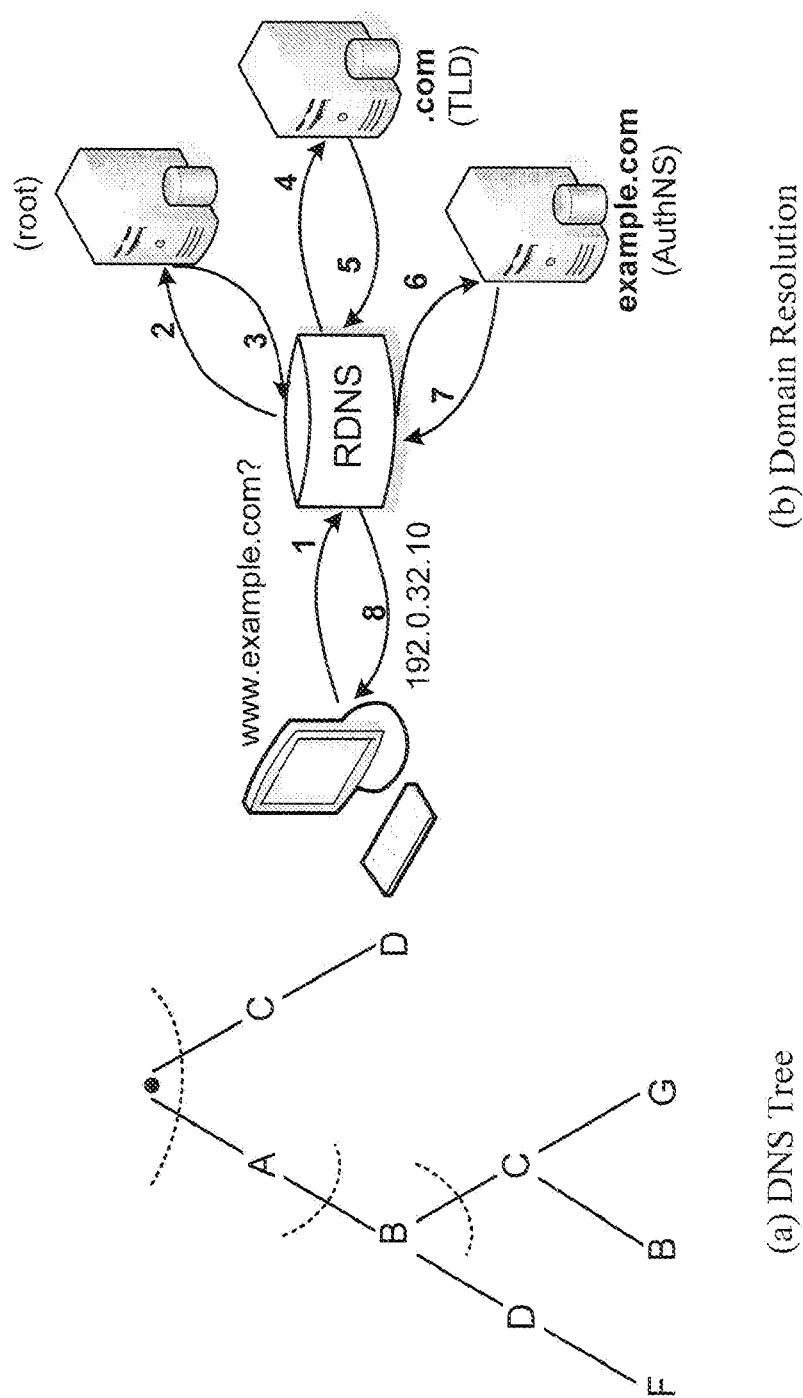
Figure 3:
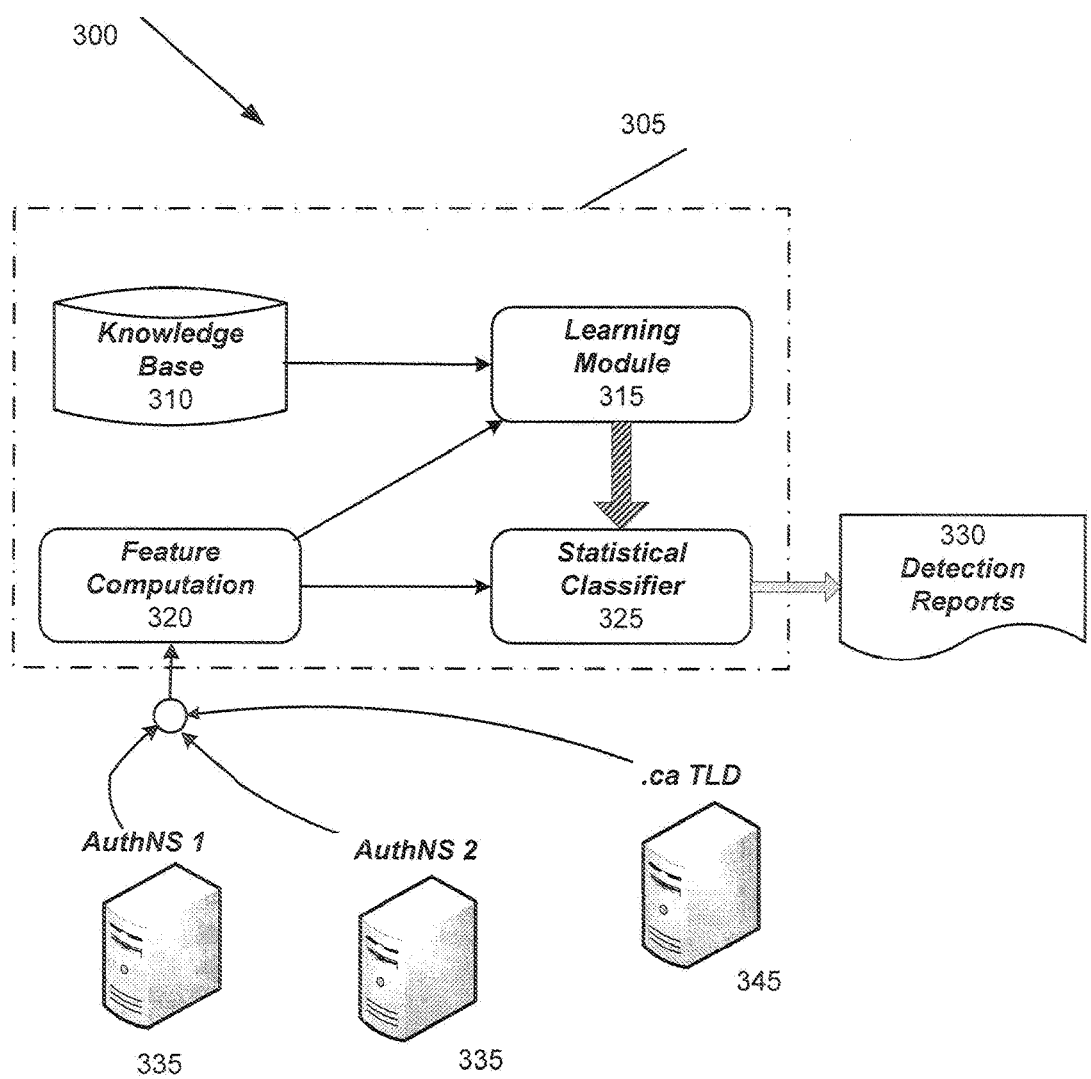

FIGS. 1-3 illustrates details related to a system for detecting a malicious domain name, according to one embodiment. (It should be noted that when the terms "a", "an," "said", etc. are used throughout this application, they should be interpreted as "at least one" "the at least one", etc.) In particular, a system can be provided that analyzes domain name system (DNS) query patterns at the upper DNS hierarchy (e.g., an authoritative name server (AUTH NS) level, a top-level domain name server (TLD NS) level, a root name server (NS) level) for the purpose of detecting new malicious domain names. In this way, in one embodiment, DNS operators can (e.g., automatically, using data available at their DNS servers) detect and remediate malicious domain names within their name space, helping to enable a rapid response. FIG. 1 illustrates various levels within a DNS hierarchy. As one moves higher up in the DNS hierarchy, global visibility of domain name resolutions can be increased. Thus, if DNS traffic is monitored (e.g., with a sensor) at an AUTH NS, all DNS queries originating from all recursive domain name system (RDNS) resolvers that attempt to resolve a domain name for which the AUTH NS has authority or is a point of delegation can be monitored. Even in the case where the NS server is anycasted (e.g., where the NS server sends data to the nearest host(s), which will then send the message to its nearest host(s), etc.), it can be assumed that the same physical authority governs all the anycasted servers. Therefore the global data gather can still be possible by the same physical authority. Similarly, if DNS traffic is monitored (e.g., with a sensor) at a TLD NS, all DNS queries originating from all RDNS resolvers and all AUTH NSs that attempt to resolve a domain name for which the TLD NS has authority or is a point of delegation can be monitored. Thus, in one embodiment, less sensors can be utilized, which can lessen: operational costs, privacy concerns, or difficulties related to establishing and maintaining relationships between different network operators, or any combination thereof. It should be noted that as one moves up higher in the DNS hierarchy, DNS caching can become stronger, and thus only a smaller subset of queries to domain names may be visible. This can be because, at the TLD level, the effect of DNS caching from recursive DNS servers worldwide can be analogous to the Time To Live (TTL) value for each domain name (e.g., the TTL for google.com can be shorter than the TTL for .com).

FIG. 2 illustrates an example of a domain name tree and a domain name resolution process. Section (a) of FIG. 2 illustrates how a domain name system can be structured like a tree. A domain name can identify a node in the tree. For example, the domain name F.D.B.A. can identify the path from the root "." to a node F in the tree. The set of resource information associated with a particular domain name can be composed of resource records (RRs). The domain name related to a given RR is called the owner of that RR. The depth of a node in the tree can be referred to as a domain level. For example, A can be a TLD, B.A. can be a second-level domain (2LD), D.B.A. can be a third-level domain (3LD), etc.

The information related to the domain name space can be stored in a distributed domain name database. The domain name database can be partitioned by "cuts" made between adjacent nodes. After all cuts are made, each group of connected nodes can represent a separate zone. Each zone can have at least one node, and thus a domain name for which it is authoritative. For each zone, a node which is closer to the root than any other node in the zone can be identified. The name of this node can be used to identify the zone. For example, assume there is a zone cut in the path between nodes B and A, as shown in section (a) of FIG. 2. In this case, the zone to which the domain F.D.B.A. belongs can be identified with the domain name B.A. (The last ".", which represents the root, is often omitted, such as when "com" is used instead of "com.".) The RRs of the nodes of a given zone can be served by one or more AUTH NSs. A given AUTH NS can support one or more zones. AUTH NSs that have complete knowledge about a zone (e.g., storing the RRs for all the nodes related to the zone in question in its zone files) can be referred to as having authority over that zone. AUTH NSs can also delegate the authority over part of a (sub-) zone to another AUTH NS.

DNS queries can be initiated by a stub-resolver (e.g., a WINDOWS application) on a user's machine, which can rely on a RDNS resolver for obtaining a set of RRs owned by a given domain name. The RDNS resolver can be responsible for directly contacting the AUTH NSs on behalf of the stub-resolver, obtaining the requested information, and forwarding it back to the stub-resolver. The RDNS resolver can also be responsible for caching the obtained information for a certain period of time (e.g., called time to live (TLL)), so that if the same or another stub-resolver queries again for the same information within the TTL time window, the RDNS resolver will not need to re-contact the AUTH NS. This can help improve efficiency, for example, by downloading a website faster.

Section (b) of FIG. 2 depicts a query resolution process. In 1, the stub resolver requests a resolution for www.example.com. Assuming the RDNS resolver has no cached information whatsoever, it can start the iterative process. In 2, the RDNS resolver can request from a root NS a referral for www.example.com. The root NS (in 3) can provide back the delegation for www.example.com to the .com TLD NS. Following the same iteration (4 and 5), the .com TLD NS can refer the RDNS resolver to the AUTH NS for the zone example.com. In 6 and 7, the RDNS resolver can receive the DNS resolution for the domain name www.example.com. In 8, the RDNS resolver can provide back to the stub resolver the DNS resolution for the domain name www.example.com, which is 192.0.32.10.

FIG. 3 illustrates a system 300 for detecting a malicious domain name, according to one embodiment. The system 300 described in FIG. 3 can divide monitored data streams into epochs $\{E_i\}$ (where i=1, . . . , m). For example, an epoch can be one month, one week, several days, one day, one hour, or any other time period. (It should be noted that if root servers are used, in addition to or instead of AUTH NSs and/or TLD NSs, the epoch may need to be longer than if just AUTH NSs and/or TLD NSs are used.) At the end of each epoch, system 300 can summarize the DNS traffic related to a given domain name d by computing, a number of statistical features, such as: the diversity of the IP addresses associated with the RDNS servers that queried domain name d, the relative volume of queries from the set of querying RDNS servers, or historic information related to the IP space pointed to by d, or any combination thereof. System 300 can comprise a detection application 305, AUTH NSs 335, TLD NS 345, or detection reports 330, or any combination thereof. The detection application 305 can comprise: feature computation module 320, learning module 315, statistical classifier module 310, or knowledge database 310, or any combination thereof.

System 300 can comprise a training mode and an operation mode. As discussed below in FIG. 4, in training mode, domain name statistical information can be collected from one or more TLD NSs and/or one or more AUTH NSs and the collected domain name statistical information can be utilized to determine if a domain name is malicious or benign (e.g., legitimate). In operation mode, an additional domain name can be determined to be malicious or benign depending on how close the additional domain name's statistical information is to a known malicious domain name's statistical information.

Referring back to FIG. 3, a knowledge database 310 can store information about known malicious and known benign domain names, and related resolved IPs, for which the monitored AUTH NSs and TLD NSs are authoritative or are a point of delegation. The knowledge database 310 can store summary information about query/response behavior of each domain name across m days. Each domain name in the knowledge database 310, and in turn each feature vector in a set of training vectors $V_{train}$ can be associated with a malicious or benign label. The learning module 315 can take as input the set of training vectors $V_{train}=\{v^i_d\}$ (where i=1, . . . , m), where $\forall d$ is in the knowledge base KB.

In operation mode, the feature computation module 320 and/or the statistical classifier module 310 can be utilized. The feature computation module 320 can comprise a function $F(d, E_i)=v^i_d$ that can map the DNS traffic in the epoch $E_i$ related to d into a feature vector $v^i_d$. The statistical classifier module 310 can utilize the feature vector to classify: the diversity of the IP addresses associated with the RDNS servers that queried the domain name d, the relative volume of queries from the set of querying RDNS servers, or historic information related to the IP space pointed to by d, or any combination thereof.

Figure 4:
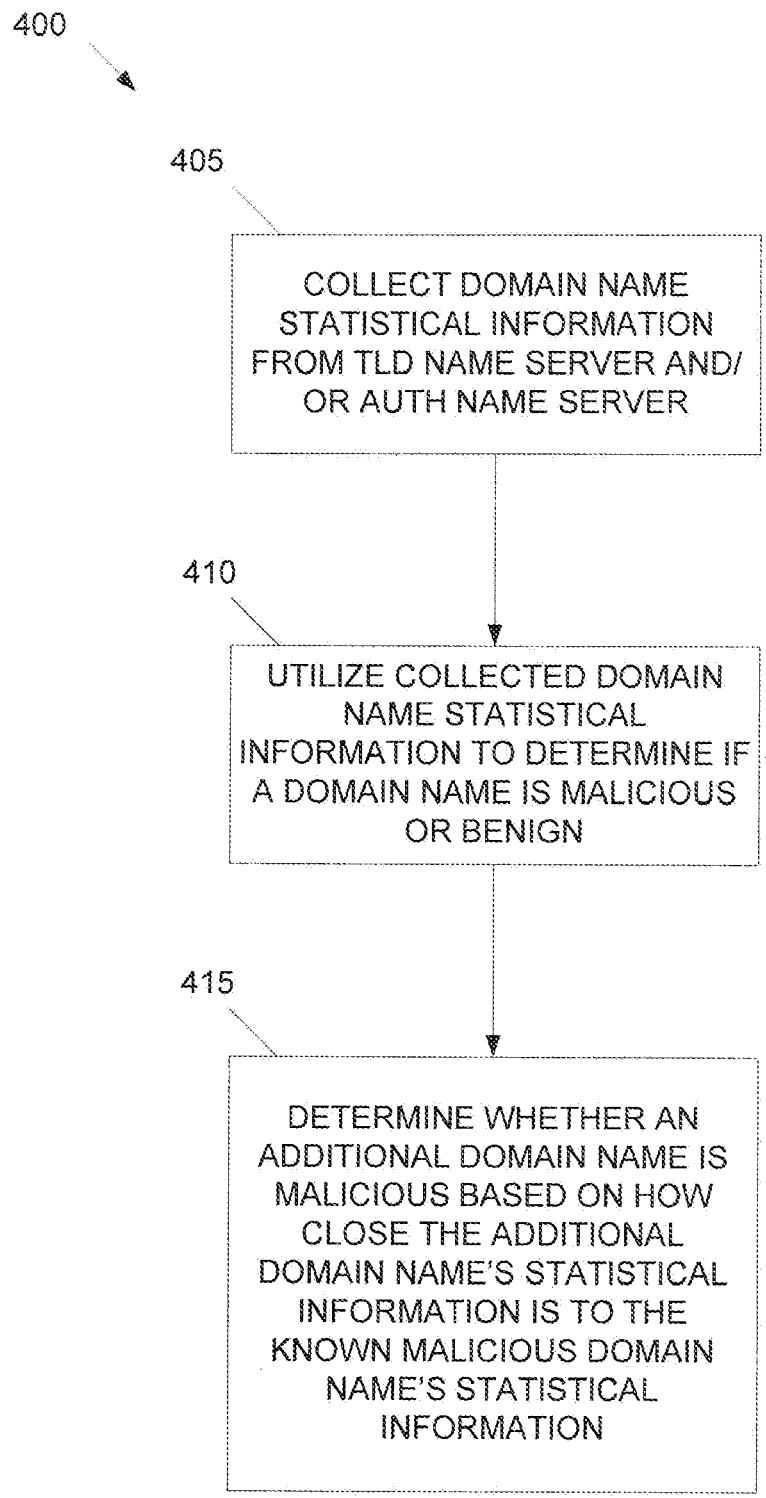
FIG. 4 illustrates a method for detecting a malicious domain name, according to one embodiment.

FIG. 4 illustrates a method 400 for detecting a malicious domain name, according to one embodiment. In 405, domain name statistical information can be collected from one or more TLD NSs, or one or more AUTH NSs, or one or more root servers, or any combination thereof. It should be noted that in some embodiments, only TLD NS(s) and/or AUTH NS(s) can be used. In 410, the collected domain name statistical information can be utilized to determine if a domain name is malicious or benign. In 415, an additional domain name can be determined to be malicious or benign depending on how close the additional domain name's statistical information is to a malicious domain name's statistical information.

For example, a stream of DNS traffic can be monitored and, at the end of an epoch, each domain or $d' \notin KB$ (e.g., all unknown domains) extracted from the query/response streams can be mapped into a feature vector $v^i_{d'}$. As discussed in more detail below, the feature vectors can be: a requester diversity vector, a requester profile vector, or a requester reputation vector, or any combination thereof. For example, assume the domain name d' is "imddos.my03.com". (This domain name (along with others) was detected and sinkholed in the middle of 2010 (http://www.damballa.com/IMDDOS/) as part of a botnet.) Based on the daily observations (in this case on the day May 21, 2010), the following three statistical vectors (which are described in more detail below) can be computed:

Requester Diversity Vector: 227 82 23 557 659 28.652173913 62.0934842839 3855.60079051 8.03658536585 18.1526076227 329.517163505 2.90308370044 4.88354100521 23.8489727496

Requester Profile Vector: 81.2208888635 689.103419745 688.485666667 474863.523104 474012.513206 638.422939068 1095.02680602 1094.0451592 1095.02680602 1199083.7059

Requester Reputation Vector: 0.0 0.0 16.0 0.0 0.0 0.0 0.0 0.0 294.0

At this point, given a domain d', the statistical classifier module 325 can gather the statistical information from any or all of these vectors (or any others), compare it to historical information in knowledge database 310, and assign a label $l_{d',j}$ and a confidence score $c(l_{d',j})$, which can express whether the query/response patterns observed for d' during epoch $E_j$ resemble either malicious or benign behavior, and with what probability. In this example, the trained classifier can label the imddos.my03.com domain name as being malicious (i.e., black) with 0.8 confidence. The output of the classifier can be the following:

[i: '2010-05-21', ii: 'imddos.my03.com', iii: 'black', iv: 'black', v: 'unknown', vi: 0.80000000000000004], where (i) is the evaluation day, (ii) is the domain name to be evaluated against the trained classifiers (e.g., using the last five days of traffic), (iii) is the correct label for the domain name (or evaluation label—which can be mandatory for proper evaluation of the classification system) (e.g., black), (iv) is the output of the classification system (e.g., black—which can be what the classifier proposes as a classification label), (v) is the label we have for the domain name at the classification day (e.g., unknown label—at the classification date there can be a number of domain names for which we have no prior information; thus we need the classification system and its proposed prediction label for the domain names with unknown labels), and (vi) is the classification probability confidence threshold on the label (iv). An operator may alter the classification probability confidence threshold so he/she can tune the false positive and true positive designations accordingly. In the example, the threshold can be set to 0.5. Detection application 305 can gather a series of labels and confidence scores $S(v^i_{d'})=\{l_{d',j}, c(l_{d',j})\}$ (where j=t, . . . , (t+m)) for m consecutive epochs (where t refers to a given starting epoch $E_t$). Detection application 305 can then compute the average confidence score $\overline{C}_M=avg_j\{c(l_{d',j})\}$ for the malicious labels assigned d' by S across the m epochs, and an alarm can be raised if $\overline{C}_M$ is greater than a predefined threshold $\theta$.

Utilizing the above method, DNS operators can monitor DNS traffic towards their AUTH NS(s) and TLD NS(s), and independently (e.g., without the need of data from other networks) detect malicious domain names within the DNS zones over which they have authority, and can thus quickly take action to "clean up" their zone files by removing the detected malicious domain names. It should be noted that removing a domain name from a zone file can effectively "convict" the domain name and prevent future successful resolution from anywhere on the Internet.

Figure 5:
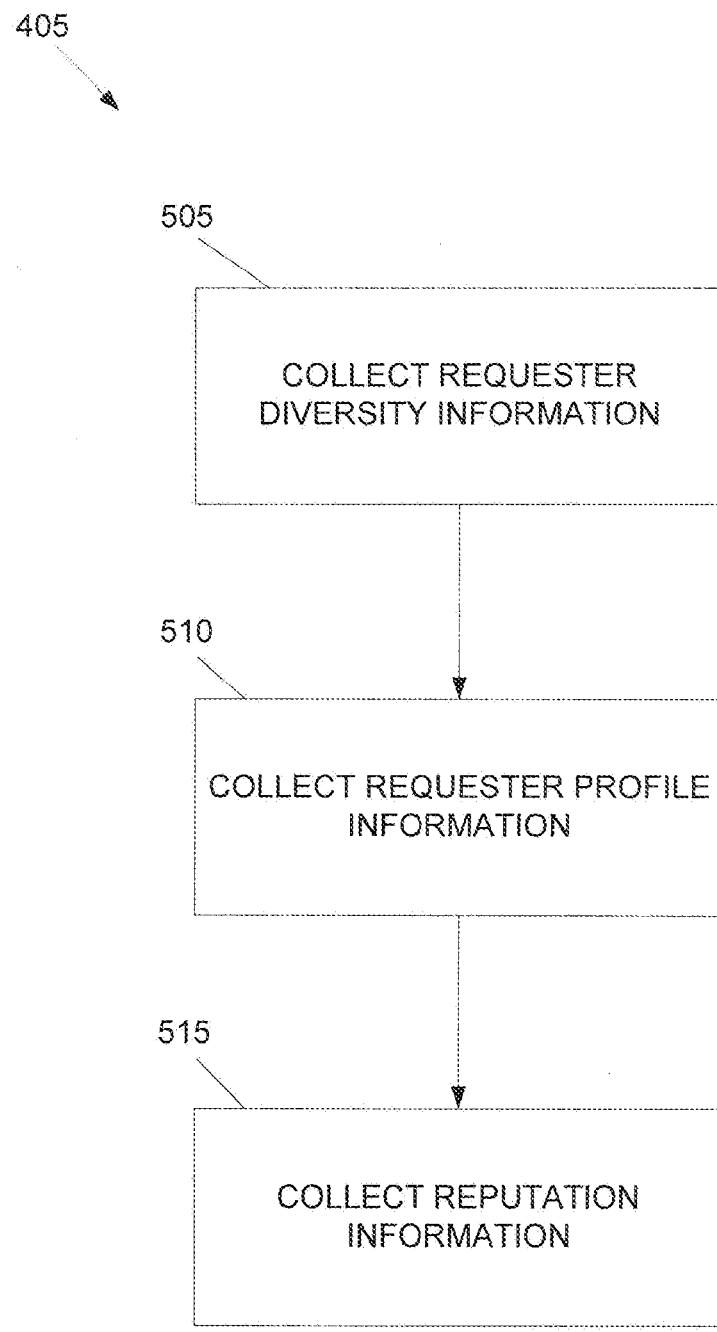
FIG. 5 illustrates details of how domain name statistical information can be collected, according to one embodiment.

FIG. 5 illustrates details of how domain name statistical information can be collected (405 of FIG. 4), according to one embodiment. In 505, requester diversity information can be collected. In 510, requester profile information can be collected. In 515, reputation information can be collected.

For each DNS query $q_j$ regarding a domain name d and the related DNS response $r_j$, the response can be translated into a tuple $Q_j(d)=(T_j, R_j, d, IPs_j)$, where $T_j$ can identify the epoch in which the query/response was observed, $R_j$ can be the IP address of the machine that initiated the query $q_j$, d can be the queried domain, and $IPs_j$ can be the set of resolved IP addresses as reported in the response $r_j$. It should be noted that since DNS queries and responses from the upper hierarchy are being monitored, in some cases, the response may be delegated to a name server which may not be monitored by system 300. In the case where the response does not carry the resolved IP address, the IPs set can be derived by leveraging a passive DNS database or by directly querying the delegated name server.

Given a domain name d and a series of tuples $Q_j(d)$ (where j=1, . . . , m), measured during a certain epoch $E_t$ (i.e., $T_j=E_t$, $\forall j=1, \ldots, m$), the system 300 can extract the following groups of statistical features.

Requester Diversity.

In one embodiment, the requester diversity information can help characterize whether the machines (e.g., RDNS servers) that query a given domain name are localized or are globally distributed. The requester diversity information can be helpful based on the fact that the distribution of machines on the Internet that query malicious domain names is on average different from the distribution of IP addresses that query legitimate domain names. For example, if an IP address with a certain border gateway protocol (BGP) prefix queries a malicious domain name, it is more likely that other IP addresses with the same BGP prefix will also look up the same malicious domain, compared to if the domain name was benign. For example, if one computer in a business' network is compromised, it is more likely that other computers in the business' network are also compromised. For example, given a domain d and a series of tuples $\{Q_j(d)\}$ (where j=1, . . . , m), the series of requester IP addresses $\{R_j\}$ (where j=1, . . . , m), can be mapped to: a BGP prefix, autonomous system (AS) numbers, and country codes (CCs) to which the IP addresses belong. Then, the distribution of occurrence frequencies of the obtained BGP prefixes (sometimes referred to as classless inter-domain routing (CIDR) prefixes), the AS numbers, and CCs can be computed. For each of these three distributions, the mean, standard deviation and variance can be computed. Also, the absolute number of distinct IP addresses (e.g., distinct values of $\{R_j\}$ (where j=1, . . . , m), and the number of distinct BGP prefixes, AS numbers and CCs can be considered. Thus, in some embodiments, thirteen statistical features that summarize the diversity of the machines that query a particular domain names, as seen from an AUTH NS or TLD NS, can be obtained.

In the example of imddos.my03.com for the day of May 21, 2010, the requester diversity vector can be:

cidr_div: 227
as_div: 82
cc_div: 23
rdns_cnt: 557
overall_cnt: 659
cc_avg: 28.652173913
cc_std: 62.0934842839
cc_var: 3855.60079051
asn_avg: 8.03658536585
asn_std: 18.1526076227
asn_var: 329.517163505
cidr_avg: 2.90308370044
cidr_std: 4.88354100521
cidr_var: 23.8489727496

In the above example, cidr_div can reflect the Classless Inter-Domain Routing (CIDR) diversity, which can be the number of different networks that the RDNS requests originated from during an epoch. The as_div can reflect the autonomous system (AS) diversity, which can be the number of autonomous systems that the RDNS requests originated from during the epoch. The cc_div can reflect the country code (CC) diversity, which can be the number of different country codes that the RDNS requests originated from during the epoch. The rdns_cnt can be the distinct IP addresses that resolved the particular domain name in the epoch. The overall_cnt can be the total number of IP addresses that resolved the particular domain name in the epoch. The cc_avg, cc_std, and cc_var can reflect the average, standard deviation, and variance of the frequency of unique IPs address per unique country codes that are observed in the epoch. The asn_avg, asn_std, and asn_var can reflect the average, standard deviation, and variance of the frequency of the unique IPs addresses per unique AS observed in the epoch. The cidr_avg, cidr_std, and cidr_var can reflect the average, standard deviation, and variance of the frequency of unique IPs per unique CIDRs observed in the epoch.

Requester Profile.

In one embodiment, the requester profile information can help determine the level of popularity of the querying RDNS servers that query a domain name. The requester profile information can be helpful based on the fact that malicious domains can tend to be queried from requesters with a large number of Internet service provider (ISP) networks because, for example, ISP networks can offer little or no protection against malicious software propagation. In addition, the population of machines in ISP networks can be very large, and therefore the probability that a machine in the ISP network will become infected by malware can be very high. On the other hand, legitimate domains are often queried from both ISP networks and smaller organization networks, such as enterprise networks, which are usually better protected against malware and therefore tend to query fewer malicious domain names.

In one embodiment, a higher weight can be assigned to RDNS servers that serve a large client population because a large network can have a large number of infected machines. While it may not be possible to precisely estimate the population behind an RDNS server, because of the DNS cache effect, the population can be measured as follows: The DNS query/response stream for a large AUTH NS that has authority over a set of domains D can be monitored. Given an epoch $E_t$, all query tuples $\{Q_j(d)\}$, $\forall j$, d, seen during $E_t$ can be considered. R can be the set of all distinct requester IP addresses in the query tuples. For each IP address $R_k \in R$, the number $c_{t,k}$ of different domain names in D queried by $R_k$ during $E_t$ can be counted. The weight associated to the requester's IP address Rk can be defined as $$W_{t,k} = \frac{C_{t,k}}{\max_{l=1}^{|R|} C_{t,l}}.$$

Once the weights $w_{t,k}$ have been defined, the requester profile features can be measured. $\{Q_i(d')\}$ (where $i=1 \ldots h$) can be the set of query tuples related to d' observed during an epoch $E_t$. In addition, R(d') can be the set of all distinct requester IP addresses in $\{Q_i(d')\}$. For each $R_k \in R(d')$, the count $c_{t,k}$ can be computed as previously described. Then, given the set $C_t(d')=\{c_{t,k}\}_k$, the average, the biased and unbiased standard deviations, and the biased and unbiased variances of the values in $C_t(d')$ can be computed. (It should be noted that the biased and unbiased estimators of the standard deviation and variance can have different values when the cardinality $|C_t(d')|$ is small.)

In the example of imddos.my03.com for the day of May 21, 2010, the un-weighted requester profile vector can be:
Cav: 638.422939068
Cstd: 1095.02680602
Cstdpop: 1094.0451592
Cstdsamp: 1095.02680602
Cvar: 1199083.7059

The Cav can be the average count of unique domain names that a particular RDNS server requested in an epoch. Similarly, the Cstd, Cstdpop, Cstdsamp, and Cvar can be the standard deviation, the population standard deviation, the sample standard deviation and variance (respectively) of the frequency of the unique domain names that were looked up by each RDNS server in an epoch. In one embodiment, the proposed size of the epoch can be at least a week and the frequency count of unique domain names can be done based (at most, in some embodiments) on a daily granularity. It should be noted, however, that many other epochs and frequencies of counts can be utilized.

Similarly, for each $R_k \in R(d')$, the count $c_{t,k}$ can be computed as previously described. Afterwards, each count can be multiplied by the weight $w_{t-n,k}$ to obtain the set $WC_t(d') = \{c_{t,k} * w_{t-n,k}\}_k$ of weighted counts. (Note that n is the number of epochs.) It should also be noted that the weights $w_{t,j}$ can be computed based on historical data about the resolver's IP address collected n epochs (e.g., seven days) before the epoch $E_t$. Then, the average, the biased and unbiased standard deviation, and the biased and unbiased variance of the values in $WC_t(d')$ can be computed.

In the example of imddos.my03.com for the day of May 21, 2010, the weighted requester profile vector can be:
Weighted Cav: 81.2208888635
Weighted Cstd: 689.103419745
Weighted Cstdpop: 688.485666667
Weighted Cvar: 474863.523104
Weighted Cvarpop: 474012.513206

The weighted features can follow the same logic described above, with each feature being multiplied by the previous described weighting factor ($WC_t(d)$).

Requester Reputation.

For the requester reputation information, in one embodiment, a dynamic domain name reputation system can be used. A dynamic domain name reputation system can use historic information about domain name resolutions to classify new domain names, for which little information (if any) is known. For example, it can be determined whether, and to what extent, a certain domain name d is related to domain names and IP addresses that have been historically recognized as either malicious or benign domain names. If d points to an IP address space that is known to host malicious activities, it is more likely that d itself is also involved in malicious activities. Alternatively, if d points to a well known, professionally run legitimate network, it is less likely that d is actually involved in malicious activity. A low reputation score can be assigned to new domain names that appear to share some similarities with known malicious domain names. Conversely, a high reputation score can be assigned to those domain names that share some similarities with legitimate, professionally administered domain names.

For example, given a domain name d and the set of query tuples $\{Q_j(d)\}$ (where, $j=1, \ldots, h$), which can be obtained during an epoch $E_t$, the overall set of resolved IP addresses $IPs(d, t) = \cup_{hj=1} IPs_j$ can be considered (where $IPs_j$ can be an element of the tuple $Q_j(d)$). If BGP(d, t) and AS(d, t) are the set of distinct BGP prefixes and autonomous system (AS) numbers to which the IP addresses in IPs(d, t) belong, the following features can be computed:

Malware Evidence. Malware evidence can help determine whether a piece of malware can be linked with a particular network address space. Malware evidence can include the average number of known malicious domain names that in a certain epoch of time have pointed to each of the IP addresses in IPs(d, t), each of the BGP prefixes in BGP(d, t), or each of the AS numbers in AS(d, t), or any combination thereof, that are on a malware list.

SBL Evidence. Spamhouse Block List (SBL) evidence (e.g., see www.spamhaus.org/sbl) can help show if a particular address space has historically been linked with fraudulent activities (e.g., spamming, phishing). SBL evidence can also include the average number of known malicious domain names that in a certain epoch of time have pointed to each of the IP addresses in IPs(d, t), each of the BGP prefixes in BGP(d, t), or each of the AS numbers in AS(d, t), or any combination thereof, that are on a SBL list.

Whitelist Evidence. The number of IP addresses in IPs(d, t), the BGP prefixes in BGP(d, t), and the AS numbers in AS(d, t) that include IP addresses pointed to by domain names in all or part of certain white lists (e.g., DNSWL, ALEXA) can be determined.

For the example of imddos.my03.com for the day of May 21, 2010, the requester reputation vector can be:
botipcAV: 0.0
botcidrcAV: 0.0
botascAV: 16.0
sblipcAV: 0.0
sblcidrcAV: 0.0
sblascAV: 0.0
whipcAV: 0.0
whcidrcAV: 0.0
whaseAV: 294.0

The botipcAV can be the average number of botnet IPs historically linked with this IP based on public evidence (e.g., Zeustracker https://zeustracker.abuse.ch/). The botcidrcAV and the botascAV can be the average number of botnet IPs historically linked with the CIDR and the AS that the IP address from the domain name points to. This count can also be obtained based on public evidence (e.g., Zeustracker https://zeustracker.abuse.ch/).

The sblipcAV can be the average number of SBL listings historically linked with this IP based on public evidence. The sblcidrcAV and the sblascAV can be can be the average number of SBL listings historically linked with the CIDR and the AS that the IP address from the domain name points to.

The whipcAV can be the average number of DNSWL (www.dnswl.org) listings historically linked with this IP based on public evidence. The whcidrcAV and the whascAV can be the average number of DNSWL (www.dnswl.org) listings historically linked with the CIDR and the AS that the IP address from the domain name points to.

While various embodiments of the present invention have been described above, it should be understood that they have been presented by way of example, and not limitation. It will be apparent to persons skilled in the relevant art(s) that various changes in the form and detail can be made therein without departing from the spirit and scope of the present invention. Thus, the invention should not be limited by any of the above-described exemplary embodiments.

In addition, it should be understood that the figures described above, which highlight the functionality and advantages of the present invention, are presented for example purposes only. The architecture of the present invention is sufficiently flexible and configurable, such that it may be utilized in ways other than that shown in the figures.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from cursory inspection the nature and essence of the technical disclosure of the application. The Abstract of the Disclosure is not intended to be limiting as to the scope of the present invention in any way.

It should also be noted that the terms "a", "an", "the", "said", etc. signify "at least one", "the at least one", "said at least one", etc., in the specification, claims and drawings. In addition, the term "comprising", etc. signifies "including, but not limited to", etc. in the specification, claims and drawings.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

The invention claimed is:

1. A method for detecting a malicious domain name, comprising:
   collecting statistical information about a domain name from at least one non-recursive domain name system name server (RDNS NS), wherein the domain name statistical information comprises at least one of requester diversity information and requester profile information;
   wherein the requester diversity information identifies each RDNS NS that queries the domain name as either localized or globally distributed, and wherein the requester profile information identifies each RDNS NS as being associated with one of internet service provider networks and enterprise networks; and
   utilizing the collected domain name statistical information to determine the reputation of a domain name and whether a domain name is malicious or benign.

2. The method of claim 1, wherein the domain name statistical information also comprises at least one of reputation information and requester diversity information.

3. The method of claim 2, wherein the reputation information classifies a domain name as malignant or benign utilizing historic information about domain name resolution.

4. The method of claim 1, further comprising:
   determining whether an additional domain name is malicious based on how close the additional domain name's statistical information is to the known malicious domain name's statistical information.

5. The method of claim 4, wherein the additional domain name is a new domain name.

6. The method of claim 1, wherein the requester diversity information comprises diversity in terms of network location of the RDNS NSs that query a domain name; or the requester profile information comprises a level of popularity of the querying RDNS NSs that query a domain name; or both.

7. The method of claim 1, wherein collecting domain name information from the non-RDNS NS comprises monitoring DNS traffic flowing towards the non-RDNS NS.

8. The method of claim 7, wherein monitoring DNS traffic flowing towards the non-RDNS NS allows monitoring of DNS queries from servers around the Internet that attempt to resolve a domain name for which the non-RDNS NS has authority or is a point of delegation.

9. The method of claim 1, wherein a sensor is attached to or by the non RDNS NS.

10. The method of claim 1, wherein a DNS operator is able to detect and remediate a malicious domain name within his or her name space.

11. The method of claim 1, wherein the non-RDNS name server comprises: a top level domain name server (TLD NS), or an authoritative name server (AUTH NS), or a root name server (NS), or any combination thereof.

12. A system for detecting a malicious domain name, comprising:
   a processor configured for:
   collecting statistical information about a domain name from at least one non-recursive domain name system name server (RDNS NS), wherein the domain name statistical information comprises at least one of requester diversity information and requester profile information;
   wherein the requester diversity information identifies each RDNS NS that queries the domain name as either localized or globally distributed, and wherein the requester profile information identifies each RDNS NS as being associated with one of internet service provider networks and enterprise networks; and
   utilizing the collected domain name statistical information to determine the reputation of a domain name and whether a domain name is malicious or benign.

13. The system of claim 12, wherein the domain name statistical information also comprises reputation information.

14. The system of claim 12, further comprising:
   determining whether an additional domain name is malicious based on how close the additional domain name's statistical information is to the known malicious domain name's statistical information.

15. The system of claim 14, wherein the additional domain name is a new domain name.

16. The system of claim 12, wherein: the requester diversity information comprises diversity in terms of network location of the RDNS NSs that query a domain name; or the requester profile information comprises a level of popularity of the querying RDNS NSs that query a domain name, or both.

17. The system of claim 12, wherein the reputation information classifies a domain name as malignant or benign utilizing historic information about domain name resolution.

18. The system of claim 12, wherein collecting domain name information from the non-RDNS NS comprises monitoring DNS traffic flowing towards the non-RDNS NS.

19. The system of claim 18, wherein monitoring DNS traffic flowing towards the non-RDNS NS allows monitoring of DNS queries from servers around the Internet that attempt to resolve a domain name for which the non-RDNS NS has authority or is a point of delegation.

20. The system of claim 12, wherein a sensor is attached to or by the non RDNS NS.

21. The system of claim 12, wherein a DNS operator is able to detect and remediate a malicious domain name within his or her name space.

22. The system of claim 12, wherein the non-RDNS name server comprises: a top level domain name server (TLD NS), or an authoritative name server (AUTH NS), or a root name server (NS), or any combination thereof.

* * * * *